(12) United States Patent
Ohtsuka et al.

(10) Patent No.: US 6,423,404 B1
(45) Date of Patent: Jul. 23, 2002

(54) LOW-TRANSMISSION TRANSPARENT LAYERED STRUCTURE, PRODUCTION METHOD THEREOF AND DISPLAY DEVICE USING THE LAYERED STRUCTURE

(75) Inventors: Yoshihiro Ohtsuka; Masaya Yukinobu, both of Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 09/484,543

(22) Filed: Jan. 18, 2000

(51) Int. Cl.[7] .................................. B32B 5/16
(52) U.S. Cl. .................. 428/328; 428/329; 428/699; 428/701
(58) Field of Search ................... 428/328, 329, 428/699, 701

(56) References Cited

U.S. PATENT DOCUMENTS

| | | | | |
|---|---|---|---|---|
| 5,291,097 A | * | 3/1994 | Kawamura et al. | 313/478 |
| 5,446,339 A | | 8/1995 | Kinoshita et al. | 313/478 |
| 5,681,885 A | * | 10/1997 | Kinoshita et al. | 524/430 |
| 5,742,119 A | * | 4/1998 | Aben et al. | 313/479 |
| 5,817,421 A | * | 10/1998 | Oishi et al. | 428/446 |
| 5,962,966 A | * | 10/1999 | Chigusa et al. | 313/479 |
| 6,001,533 A | * | 12/1999 | Sega et al. | 430/270 |

* cited by examiner

Primary Examiner—Hoa T. Le
(74) Attorney, Agent, or Firm—Dykema Gossett PLLC

(57) ABSTRACT

A low-transmission transparent layered structure made of a transparent substrate and a low-transmission transparent layer formed on the transparent substrate, wherein the low-transmission transparent layer is constituted of black pigment fine particles having a mean particle size of from 10 to 150 nm and a binder matrix as the main constituents, the black pigment fine particles are composite oxide fine particles of iron, manganese, and copper, or are carbon fine particles and black titanium compound fine particles, the visible light transmittance of the low-transmission transparent layer is from 40 to 90%, and the standard deviation of the transmittance of the low-transmission transparent layer in each wavelength every 5 nm of a visible light wavelength region (380 to 780 nm) is 5% or lower.

The low-transmission transparent layer structure has a flat transmission profile, can impart a low reflectance and antistatic and electric field shielding functions, and is used for a display device.

24 Claims, 15 Drawing Sheets

LOW-TRANSMISSION TRANSPARENT LAYERED STRUCTURE, PRODUCTION METHOD THEREOF AND DISPLAY DEVICE USING THE LAYERED STRUCTURE

BACKGROUND OF THE INVENTION

1. Field of the Invention

The present invention relates to a low-transmission transparent layered structure comprising a transparent substrate and a low-transmission transparent layer formed thereon, or a transparent substrate and two layer films made of a low-transmission transparent layer and a transparent coat layer successively formed thereon, which is used as a front plate, etc., of a display device such as, for example, a cathode ray tube (CRT), etc. Particularly, the invention relates to a low-transmission transparent layered structure which has a flat transmission profile, can further impart a low reflectance and antistatic and electric field shielding functions, and can reduce the production cost thereof, and also a production method of the layered structure and also a display device to which the low-transmission transparent layered structure is applied.

2. Description of Related Art

With recent development of office automation, the chance of working close to the display of a cathode ray tube (CRT) of a computer has been increased, in this case, it is required of the display that the displayed image is easy to see and it does not give a visual tired feeling, and also in a home color television, and the easiness of seeing the displayed image. For satisfying these requirements, as the case may be, a treatment of improving the contrast by lowering the transmittance. of the front surface glass of CRT is carried out.

In this case, a method of using a face panel (the front face panel of CRT) having a low transmittance and a method of applying a coating having a low transmittance, to a face panel having a relatively high transmittance considered but from the point that the transmittance of CRT can be freely controlled, the latter method is advantageous.

Thus, there is considered a method of coating the face panel of CRT with a coating liquid formed by dispersing carbon fine particles, which are generally widely used as black pigment fine particles, in a solvent on the face panel of CRT, but by this method, there is a problem that the transmission profile of the film formed is lowered in the short wavelength side of a visible light as shown in Comparative Example 1 of FIG. 1 and the coated film becomes a brownish transmission color.

Also, as other attempt of making easy to see a displayed image, it has been carried out to applying an anti-glare treatment on the surface of a face panel to restrain the reflection of the image. For example, the anti-glare treatment may be practiced even by a method of forming fine roughness on the surface of the face panel to increase the diffused reflection at the surface, but because in the case of using this method, the resolution is lowered to deteriorate the image quality, the method cannot be said to be so preferred.

Accordingly, it is preferred to carry out the anti-glare treatment by an interference method of controlling the refractive index and the film thickness of the transparent film so that the reflected light rather causes a destructive interference to the incident light. To obtained the low reflection effect by such an interference method, a double layer structure film wherein the optical film thicknesses of the high refractive index film and the low refractive index film are established to $1/4\lambda$ and $1/4\lambda$, $1/2\lambda$ and $1/4\lambda$ ($\lambda$: wavelength) is generally employed.

Thus, there is a method of using carbon fine particles as the black pigment fine particles, after coating a coating liquid formed by dispersing the carbon fine particles in a solvent on the face panel of CRT followed by drying, over-coating thereon a coating liquid made of a silica sol, etc., as the main constituent, and heat-treating the coated layer at about 200° C. to obtain a film of a low reflectance as the double layer structure film. By this method, good reflection characteristics as shown in Comparative Example 4 of FIG. 2 are obtained but there is the problem as described above that the transmission profile of the film is lowered in the short wavelength side of a visible light as shown in Comparative Example 4 of FIG. 7 to give a brownish transmittance color.

Now, in the case of working close to CRT, there is a case of being required that there is neither attaching of dust nor electric shock by the electrostatic charging on the surface of CRT in addition to that the displayed image is easy to see and does not give visually tired feeling. Furthermore, in addition to these requirements, recently, bad influences of the low-frequency electromagnetic waves generated from CRT to a human body are anxious about and it has also been desired to CRT that such an electromagnetic wave does not leak outside.

The electromagnetic waves are generated from deflecting coils and flyback transformers and the leakage of magnetic fields can be prevented in its greater part by designing, e.g., by the changing of deflecting coils in shape. As for the leakage of electric fields, it can be prevented by forming a transparent electrically conductive layer on the surface of the face panel of CRT.

Measures to prevent such leakage of electric fields are theoretically the same as: the countermeasures taken in recent years to prevent electrostatic charging. However, it has been desired that the surface resistance of the transparent electrically conductive layer is from about $10^8$ to $10^{10}$ Ω/square for the electrostatic charging prevention and is at most $10^6$ Ω/square for electric field shielding.

Thus, to cope with the various requirements described above, a method using tin antimony oxide (ATO) fine particles or indium tin oxide (ITO) fine conductive particles as the transparent fine conductive particles, and after coating a transparent conductive fine particle-containing coating liquid formed by dispersing the transparent conductive fine particles in a solvent together with a binder such as an alkyl silicate on the face panel of CRT followed by drying, heat-treating the coated layer at a temperature of about 200° C. to form a transparent electrically conductive layer is known.

However, because the above-described transparent conductive fine particles used in the method do not absorb a visible light, to obtain a low-transmission film for improving the contrast, it is necessary to incorporate carbon fine particles, etc., in the transparent electrically conductive layer, and when carbon fine particles are incorporated, there is a problem that a flat transmission profile is not obtained and the film coated is colored in a brownish color as in the above-described case.

SUMMARY OF THE INVENTION

The present invention has been made in view of the problems described above and an object of this invention is to provide a low-transmission transparent layered structure having particularly a flat transmission profile, capable of imparting a low reflectance and an antistatic/electric field shielding function, and capable of reducing the production cost and also to a production method of the low-transmission transparent layered structure, and further to provide a display device to which the low-transmission transparent layered structure is applied.

The low-transmission transparent layered structure of the 1st embodiment of the invention for attaining the above-described objects is a low-transmission transparent layered structure comprising a transparent substrate and a low-transmission transparent layer formed on the transparent substrate, wherein the low-transmission transparent layer is constituted of black pigment fine particles having a mean particle size of from 10 to 150 nm and a binder matrix as the main constituents, the black pigment fine particles are composite oxide fine particles of iron, manganese, and copper, or they are carbon fine particles and black titanium compound fine particles, the transmission for visible light of the low-transmittance transparent layer is from 40 to 90%, and further the standard deviation of the transmission of the low-transmittance in each wavelength of every 5 nm of a visible light wavelength region (380 to 780 nm) is 5% or lower.

Also, in the low-transmission transparent layered structure of the 1st embodiment of this invention, the black titanium compound is black titanium oxide or black titanium oxynitride, the mixing ratio of the black titanium compound fine particles to the carbon fine particles is from 80 to 2500 parts by weight of the black titanium compound fine particles to 100 parts by weight of the carbon fine particles and the constituting ratio of the binder matrix to the black pigment fine particles in the low-transmission transparent layer is from 150 to 650 parts by weight of the binder matrix to 100 parts by weight of the black pigment fine particles.

Also, in the low-transmission transparent layered structure of the 1st embodiment of this invention, the low-transmission transparent layer further contains electrically conductive oxide fine particles having a mean particle size of from 10 to 150 nm, the compounding amount of the electrically conductive oxide fine particles is from 50 to 1000 parts by weight to 100 parts by weight of the black pigment fine particles, the surface resistance of low-transmission transparent layer is from $10^4$ to $10^{10}$ Ω/square, the electrically conductive oxide fine particles are at least one kind of fine particles selected from indium tin oxide fine particles and tin antimony oxide fine particles, and further a double layer film formed by the low-transmission transparent layer and a transparent coat layer is formed on the transparent substrate. Also, in the low-transmission transparent layered structure described above, the reflectance of the low-transmission transparent layered structure, which becomes minimum in the reflection profile of a visible light region is 3or lower, the visible light transmittance of the double layer film is from 40 to 90%, and further the standard deviation of the transmittance of the double layer film in each wavelength of every 5 nm of a visible light wavelength region (380 to 780 nm) is 5% or lower.

Furthermore, the low-transmission transparent layered structure is a low-transmission transparent layered structure having a double layer film formed by forming the low-transmission transparent layer containing the electrically conductive oxide fine particles and a transparent coat layer on the transparent substrate, wherein the reflectance of the low-transmission transparent layered structure, which becomes minimum in the reflection profile of a visible light region, is 3% or lower, the surface resistance and the visible light transmittance of the double layer film are from $10^4$ to $10^{10}$ Ω/square and from 40 to 90% respectively, and the standard deviation of the transmittance of the double layer film in each wavelength of every 5 nm of a visible light wavelength region (380 to 780 nm) is 5% or lower. Also, in the above-described low-transmission transparent layered structure, each of the binder matrix of the low-transmission transparent layer and the transparent coat layer are made of silicon oxide as the main constituent.

Then, in a method of producing a low-transmission transparent layered structure of the 2nd embodiment of this invention, a coating liquid formed by dispersing black pigment fine particles having a mean particle size of from 10 to 150 nm made of composite oxide fine particles of iron, manganese, and copper, or made of carbon fine particles and black titanium compound fine particles, and an inorganic binder constituting a binder matrix in a solvent as the main constituents is prepared and after coating the coating liquid on a transparent substrate, the layered structure thus coated is subjected to a heating treatment.

Also, in the method of producing a low-transmission transparent layered structure of the 2nd embodiment of this invention, the constituting ratio of the inorganic binder to the black pigment fine particles of the coating liquid is from 150 to 650 parts by weight of the inorganic binder to 100 parts by weight of the black pigment fine particles, the coating liquid further contains electrically conductive fine particles having a mean particle size of from 10 to 150 nm, and the compounding amount of the electrically conductive oxide fine particles is from 50 to 1000 parts by weight to 100 parts by weight of the black pigment fine particles.

In a method of producing a low-transmission transparent layered structure of the 3rd embodiment of this invention, a coating liquid formed by dispersing black pigment fine particles having a mean particle size of from 10 to 150 nm, made, of composite oxide fine particles of iron, manganese, and copper or made of carbon fine particles and black titanium compound fine particles in a solvent as the main constituent is prepared, the coating liquid is coated on a transparent substrate, and then after coating a coating liquid for forming a transparent coat layer, the layered structure coated is subjected to a heating treatment.

Also, in the method of producing a low-transmission transparent layered structure of the 3rd embodiment of this invention, the coating liquid further contains electrically conductive oxide fine particles having a mean particle size of from 10 to 150 nm, the compounding amount of the electrically conductive oxide fine particles is from 50 to 1000 parts by weight to 100 parts by weight of the above-described black pigment fine particles, the coating liquid further contains an inorganic binder constituting a binder matrix, and the electrically conductive oxide fine particles are at least one kind of fine particles selected from indium tin oxide fine particles and tin antimony oxide fine particles.

Moreover, in the method of producing a low-transmission transparent layered structure of the 2nd or 3rd embodiment of this invention, the black titanium compound is black titanium oxide or black titanium oxynitride, the mixing ratio of the black titanium compound fine particles to the carbon fine particles is from 80 to 2500 parts by. weight of the black titanium compound to 100 parts by weight of the carbon fine particles, and furthermore, the inorganic binder of each of the coating liquid for forming the transparent coat layer and the above-described coating liquid having dispersed therein the fine particles is made of a silica sol as the main constituent.

Then, a display device of the 4th embodiment of this invention is a display device comprising a main body and a front face plate disposed at the front face side of the main body, wherein the low-transmission transparent layered structure of the 1st embodiment is disposed with the low-transmission transparent layer side thereof outside as the front face plate.

DETAILED DESCRIPTION OF THE INVENTION

Figure 1:
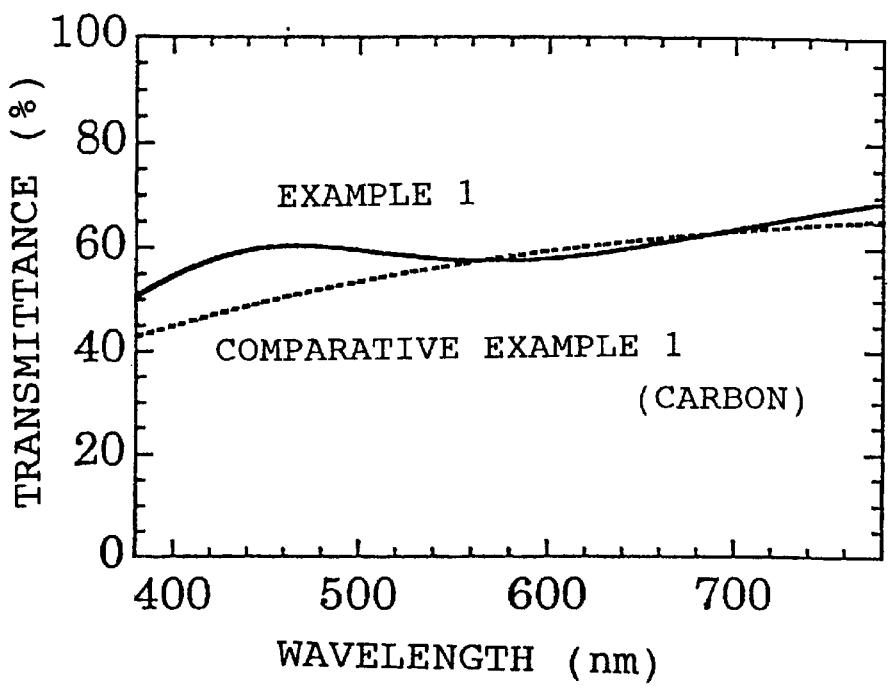
FIG. 1 is a graph showing the transmittance profiles of the low-transmission transparent layered structures of Example 1 and Comparative Example 1.

Then, the invention is described in detail.

In general, as a black pigment, carbon, black titanium compounds, iron oxide ($Fe_2O_3$), etc., are considered but the composite oxide fine particles of iron, manganese, and copper shows a higher blackness than other black pigments such as carbon, etc., and thus, in this invention, based on, the conception that by using the composite oxide fine particles of iron, manganese, and copper for a low-transmission transparent layer, a film excellent in the flatness of the transmission profile can be obtained, and also based on the conception that by using black pigment fine particles made of carbon fine particles and black titanium compound fine particles as the low-transmission transparent layer, the transmission profile of the film can be greatly improved as compared with the case of using the carbon fine particles or the black titanium compound particles singly, the problems described above are solved.

Also, the composite oxide of iron, manganese, and copper is a compound having a spine structure shown by, for example, the chemical formula: $(Cu, Fe, Mn)(Fe, Mn)_2O_4$ and is constituted of from 33 to 36% by weight CuO, from 30 to 51% by weight MnO, and from 13 to 35% by weight $Fe_2O_3$. Hereinafter, the composite oxide of iron, manganese, and copper is sometimes referred to as simply "Fe—Mn—Cu—O".

Also, as the black titanium compound which is used together with carbon black fine particles as a black pigment used for the low-transmission transparent layer, it is preferred to use black titanium oxide or black titanium oxynitride. The black titanium oxide is titanium sub-titanium sub-oxide ($TiO_{2-x}$) in a hydrogen atmosphere obtained, for example, by treating titanium oxide ($TiO_2$)in a hydrogen atmosphere at a high temperature, and on the other hand, the black titanium oxynitride is a nitrogen-containing titanium compound ($Ti_xO_yN_z$) obtained by treating titanium oxide ($TiO_2$) in an ammonia atmosphere at a high temperature.

The compounding ratio of the carbon fine particles and the black titanium compound fine particles is desirably that the black titanium compound is in the range of from 80 to 2500 parts by weight, and preferably from 100 to 2000 parts by weight to 100 parts by weight of the carbon fine particles.

The reason for establishing the compounding ratio of the black titanium compound is that when the compounding ratio is less than 80 parts by weight or exceeds 2500 parts by weight, the flatness of the transmission profile of the low-transmission transparent layer formed is deteriorated.

To further imparting an antistatic function and an electric-field shielding function to the low-transmission transparent layer in this invention, electrically conductive oxide fine particles are added to the low-transmission transparent layer. As the electrically conductive oxide fine particles, tin antimony oxide (ATO) fine particles or indium tin oxide (ITO) fine particles are preferably used, in the case of using the ATO fine particles, the film having the surface resistance of from about $10^8$ to $10^{10}$ Ω/square can be obtained, and in the case of using the ITO fine particles, the film having the surface resistance of from about $10^4$ to $10^6$ Ω/square can be obtained.

Also, it is desirable that the compounding amount of the electrically conductive oxide fine particles are established in the range of from 50 to 1000 parts by weight, and preferably from 80 to 600 parts by weight to 100 parts by weight of the black pigment particles. When the compounding ratio of the electrically conductive fine particles is less than 50 parts by weight, the addition thereof does not contribute to impart an electrical conductivity and, on the other hand, when the electrically conductive oxide fine particles are compounded in an amount exceeding 1000 parts by weight, the more improved effect of the electric conductivity cannot be obtained, which is rather undesirable from the point of cost.

Furthermore, in the composite oxide fine particles of iron, manganese, and copper, and the carbon and black titanium compound fine particles as the black pigment fine particles and also the electrically conductive fine particles used in this invention, it is necessary that the mean particle size of them is in the range of from 10 to 150 nm.

The reason that the mean particle size of these fine particles is in the range of from 10 to 150 nm is that when the mean particle size thereof is less than 10 nm, the production of such fine particles is difficult and also in the case of preparing a coating composition of such fine particles, the dispersion of the fine particles is not easy and such particles have no practical use. On the other hand, when the mean particle size exceeds 150 nm, scattering of a visible light at the low-transmission transparent layer formed becomes large, that is, the haze value of the film is increased, which are unsuitable for practical use. In addition, the mean particle size in this invention means a mean particle size of fine particles observed by a transmission electron microscope (TEM).

Also, the low-transmission transparent layer forming coating liquids in this invention can be produced by the following methods.

First, the composite oxide fine particles of iron, manganese, and copper or the carbon and black titanium compound fine particles as the black pigment fine particles are mixed with a dispersing agent and a solvent and by dispersing the mixture using a dispersing apparatus such as a paint shaker, a sand: mill, an ultrasonic dispersing apparatus, etc., a uniform black pigment fine particle dispersion is obtained. About the ATO fine particles or the ITO fine particles as the electrically conductive oxide fine particles, by similarly mixing and dispersing, a uniform dispersion of the electrically conductive oxide fine particles is obtained.

The above-described dispersing treatment can be carried out on each fine particles singly or on the mixture of plural kinds of the fine particles. For example, a dispersion containing both of the black pigment fine particles and the electrically conductive oxide fine particles can be obtained at the same time. By mixing the dispersion with an inorganic binder, which is a binder matrix component, and/or a solvent, the low-transmission transparent layer forming coating liquid in this invention can be prepared. In addition, the inorganic binder may be added at the dispersing treatment.

In this case, as the silica sol applied to the inorganic binder, a polymer obtained by hydrolyzing an ortho-alkyl silicate by adding thereto water and an acid catalyst and advancing a dehydro-polycondensation, or a polymer obtained by further applying a hydrolysis and dehydro-polycondensation to a commercially available alkyl silicate solution wherein a hydrolysis polycondensation has already advanced to a tetra- to pentamer can be utilized.

In addition, when the dehydro-polycondensation proceeds, the solution viscosity is increased and finally the solution is solidified. Accordingly, the extent of the dehydro-polycondensation is controlled below the upper limit of: the viscosity of the solution coatable on the transparent substrate such as a glass substrate or a plastic substrate. In this case, however, there is no restriction on the extent of the dehydro-polycondensation if the extent is a level lower than the above-described upper limit but on considering the film strength, the weather resistance of the film, etc., the extent is preferably from about 500 to 3000 as the weight-average molecular weight.

Then, the low-transmission transparent layered structure of this invention is described in detail.

First, the low-transmission transparent layered structure of this invention comprising a transparent substrate and a low-transmission transparent layer formed on the transparent substrate is explained.

In the low-transmission transparent layer, the constituting ratio of the black pigment fine particles and the binder matrix is that the binder matrix is from 150 to 650 parts by weight, and preferably from 250 to 500 parts by weight to 100 parts by weight of the black pigment fine particles.

This is because in the black pigment fine particles used in this invention, the composite oxide fine particles of iron, manganese, and copper are poor in the acid resistance and the composite oxide fine particles of iron, manganese, and copper in the low-transmission transparent layer are greatly deteriorated with, for example, acetic acid, etc., and also when the amount of the binder matrix is in the range of from 150 to 650 parts by weight, the composite oxide fine particles of iron, manganese, and copper are protected by the binder matrix made of silicon oxide as the main constituent, whereby the low-transmission transparent layer shows an excellent weather resistance. Also, from the point of the strength of the low-transmission transparent layer, the above-described constituting ratio is also preferred.

Also, the reason of making the range of binder matrix from 150 to 650 parts by weight is that when the binder matrix is less than 150 parts by weight, the protective effect of the binder matrix is insufficient, the weather resistance and the chemical resistance of the low-transmission transparent layer are deteriorated, and the strength of the low-transmission transparent layer is lowered, which are undesirable for the practical use, while when the amount of the binder matrix exceeds 650 parts by weight, the amount of the binder matrix made of silicon oxide as the main constituent is too much and in the case of forming a relatively low transmission transparent layer having a visible light transmission of from about 40 to 70%, there is a problem that at heat-treating in low transmission transparent layer, the low transmission transparent layer is cracked and peeled off.

Then, the formation of the low-transmission transparent layer on a transparent substrate can be carried out by the following method.

A low-transmission transparent layer forming coating liquid made of, for example, a solvent and black pigment fine particles having a mean particle size of from 10 to 150 nm and an inorganic binder constituting the binder matrix dispersed in the solvent as the main constituents is coated on a transparent substrate such as a glass substrate or a plastic substrate by a method such as spray coating, spin coating, wire bar coating, doctor blade coating, etc., and after, if necessary, drying, a heat treatment is applied at a temperature of, for example, from about 50 to 500° C. to form the low-transmission transparent layer.

Also, a low-transmission transparent layer forming coating liquid obtained by further adding an ATO fine particles or an ITO fine particles as the electrically conductive oxide fine particles to the above-described low-transmission transparent layer forming coating liquid made of a solvent and the black pigment fine particles having a mean particle size of from 10 to 150 nm and the inorganic binder constituting the binder matrix may be used.

In this case, the inorganic binder constituting the binder matrix is made of a silica sol as the main constituent and at heat-treating the low-transmission transparent layer, the dehyro-polycondensation reaction is almost completed and the inorganic binder becomes a hard silicate film (a film made of silicon oxide as the main constituent). In addition, by adding magnesium fluoride fine particles, an alumina sol, a titania sol, a zirconia sol, etc., to the above-described silica sol, the refractive index of the low-transmission transparent layer is controlled and the film characteristics (for example, reflectivity, etc.) can be changed.

Then, the low-transmission transparent layered structure of this invention comprising a transparent substrate and a double layer film constituted of a low-transmission transparent layer and a transparent coat layer successively formed on the transparent substrate is explained.

In the low-transmission transparent substrate, the optical constant (n–ik; n: refractive index, $i^2=-1$, k: extinction coefficient) of the black pigment fine particles has not been clarified but by the double layer film construction of the low-transmission transparent layer made of the black pigment fine particles or the black pigment fine particle and the electrically conductive oxide fine particles, and the binder matrix, and the transparent coat layer made of silicon oxide as the main constituent, good low-reflection characteristics are obtained.

Also, because in the low-transmission transparent layered structure described above, the transparent coat layer made of silicon oxide as the main constituent is formed on the low-transmission transparent layer, the black pigment fine particles in the low-transmission transparent layer, such as the composite oxide fine particles of iron, manganese, and copper are protected by the transparent coat layer, whereby the weather resistance, the chemical resistance, etc., are greatly improved. For example, in the low-transmission transparent layer having not formed the transparent coat layer, that is made of only the composite oxide fine particles of iron, manganese, and copper without containing the binder matrix, when the low-transmission transparent layer structure substrate is immersed in an aqueous solution of 50% acetic acid for about one day, the great increase of the transmittance and the change of the film color by the deterioration of the film (low-transmission transparent layer) are observed but in the low-transmission transparent layer in this invention having formed thereon the transparent coat layer, the low-transmission transparent layer is scarcely changed in the same immersion test and shows an excellent weather resistance.

Also, the formation of the double layer film on the transparent substrate can be carried out by the following method.

A low-transmission transparent layer forming coating liquid made of, for example, a solvent and black pigment fine particles having a mean particle size of from 10 to 150 nm in the solvent as the main constituents is coated on a transparent substrate such as a glass substrate or a plastic substrate by a method such as spray coating, spin coating, wire bar coating, doctor blade coating, etc., and after, if necessary, drying, a transparent coat layer forming coating liquid made of a silica sol as the main constituent is over-coated thereon by the method described above. As the silica sol, the same one as the silica sol used for the inorganic binder can be used.

Then, after over-coating, the over-coated transparent coat layer is cured by applying a heat treatment at a temperature of, for example, from about 50 to 500° C. to form the double layer film.

In this case, at the case of over-coating the transparent coat layer forming coating liquid made of a silica sol, etc., as the main constituent by the above-described method, the over-coated silica sol liquid (the silica sol liquid becomes the binder matrix made of silicon oxide as the main constituent by the heat treatment) permeate into fine gaps of the composite oxide fine particle layer formed by previously coating the low-transmission transparent layer forming coating liquid made of the black pigment fine particles as the main constituent, whereby the improvement of the strength and the more improvement of the weather resistance are simultaneously attained.

Also, in the formation step of the low-transmission transparent layer, a low-transmission transparent layer forming coating liquid obtained by adding a silica sol liquid as the inorganic binder component constituting the binder matrix and/or the ATO fine particles or the ITO fine particles as the electrically conductive oxide fine particles to the low-transmission transparent layer forming coating liquid made of a solvent and the black pigment fine particles having a mean particle size of from 10 to 150 nm dispersed in the solvent may be used. In this case, as described above, by permeation of the over-coated silica sol liquid into the fine gaps of the black pigment fine particles and the silica sol and/or the electrically conductive oxide fine particles, the improvement of the strength and the more improvement of the weather resistance are simultaneously attained.

Also, the silica sol liquid becomes a hard silicate film (a film made of silicon oxide as the main constituent) by almost accomplishing the hydro-polycondensation reaction at heat-treating the double layer film. In addition, by adding magnesium fluoride fine particles, an alumina sol, a titania sol, a zirconia sol, etc., to the silica sol, the refractive index of the transparent coat layer is controlled and the reflectivity of the double layer film can be changed.

As described above, in the low-transmission transparent layered structure of this invention, the principal part thereof is constituted of (1) or (2) below.

(1) A transparent substrate such as a glass substrate, a plastic substrate, etc., and a low-transmission transparent layer made of the black pigment fine particles having a mean particle size of from 10 to 150 nm and the binder matrix, or the black pigment fine particles having a mean particle size of from 10 to 150 nm, the electrically conductive oxide fine particles having a mean particle size of from 10 to 150 nm, and the binder matrix formed on the transparent substrate.

(2) A transparent substrate such as a glass substrate, a plastic substrate, etc., and a double layer film comprising the first layer of the low-transmission transparent layer made of the black pigment fine particles having a mean particle size of from 10 to 150 nm, or the black pigment fine particles having a mean particle size of from 10 to 150 nm and the electrically conductive oxide fine particles having a mean particle size of from 10 to 150 nm, and the binder material as the main constituent(s), and the second layer of the transparent coat layer formed on the low-transmission transparent layer successively formed on the transparent substrate.

Also, according to the low-transmission transparent layered structure of this invention of the above-described construction (1), the visible light transmission of the low-transmittance transparent layer is from 40 to 90%, the standard deviation of the transmittance of the low-transmission transparent layer in each wavelength at every 5 nm of a visible light region (380 to 780 nm) can be reduced to 5% or lower, and when the low-transmission transparent layer contains the electrically conductive fine particles, the surface resistance of the low-transmission transparent layer can be maintained in the range between $10^4$ and $10^{10}$ Ω/square.

Also, according to the low-transmission transparent layered structure of this invention of the above-described constitution (2), the visible light transmittance of the double layer film is from 40 to 90%, the standard deviation of the transmittance of the low-transmission transparent layer in each wavelength at every 5 nm of a visible light region (380 to 780 nm) can be reduced to 5% or lower, and also when the low-transmission transparent layer as the first layer contains the electrically conductive oxide fine particles, the surface resistance of the low-transmission transparent layer can be maintained in the range between $10^4$ and $10^{10}$ Ω/square, and further, the reflectance of the low-transmission transparent layer, which becomes minimum in the reflection profile of a visible light region can be reduced to 3% or lower.

As described above, the low-transmission transparent layered structure of this invention has a very flat transmission profile as compared with those of relates arts and thus can be suitably used as a front plate of a display device such as cathode ray tube (CRT), etc.

The examples of this invention are practically described below together with comparative examples but the invention is not limited to these examples. Also, "%" therein is "% by weight" except the "%" of a transmittance, a reflectance and a haze vale and all "parts" therein, unless otherwise indicated, are "parts by weight".

In addition, in the tables and the figures described hereinbelow, the transmittance (A) of the low-transmission transparent layer only without containing the transparent substrate (glass substrate) in each wavelength every 5 nm of a visible light wavelength region (380 to 780 nm) is obtained according to the following formula 1, and the transmittance (B) of the double layer film constituted of the low-transmission transparent layer and the transparent coat layer without containing the transparent substrate (glass substrate) is obtained according to the following formula 2;

$$A(\%)=[C/D]\times 100 \qquad 1$$

A: The transmittance of the low-transmission transparent layer without containing the transparent substrate.

C: The transmittance of the low-transmission transparent layer together with the transparent substrate.

D: The transmittance of the transparent substrate.

$$B(\%)=[C'/D]\times 100 \qquad 2$$

B: The transmittance of only the double layer film without containing the transparent substrate.

C': The transmittance of the double layer film together with the transparent substrate.

D: The transmittance of the transparent substrate.

Also, unless particularly indicated, the transmission and the transmittance profile used are for only the low-transmission transparent layer without containing the transparent substrate or for only the double layer film constituted of the low-transmission transparent layer and the transparent coat layer without containing the transparent substrate.

Furthermore, the haze value and the visible light transmittance were measured together with the transparent substrate using a haze meter (HR-200) manufactured by Murakami Color Research Laboratory, the reflectance and the reflection transmission profiles were measured using a spectrophotometer (U-4000) manufactured by Hitachi, Ltd., the dispersed particle size (diameter) of black pigment fine particles in the dispersion thereof was measured using a laser scattering particle size analyser (ELS-800) manufactured by Otsuka Electronics Co., Ltd. the particle size (diameter) of black pigment fine particles was measured by a transmission electron microscope manufactured by JEOL LTD., and the surface resistance of the low-transmission transparent layer was measured using a surface resistance meter, Halester IP (MCT-HT260) and Loresta AP (MCP-T400) manufactured by Mitsubishi Chemical Corporation.

EXAMPLE 1

After mixing 16.0 g of composite oxide fine particles of iron, manganese, and copper (TMB #3550, trade name, manufactured by DAINICHISEIKA COLOR & CHEMICALS MFG. CO., LTD.) with 3.2 g of a dispersing agent and 60.8 g of pure water, the mixture was dispersed with zirconia beads by a paint shaker to obtain a dispersion (liquid A) of composite oxide fine particles of iron, manganese, and copper having a dispersed particle size of 104 nm.

Then, using 19.6 parts of methyl silicate 51 (trade name, manufactured by Colcoat Co., Ltd.), 70.3 parts of ethanol, 7.9 parts of an aqueous 1% nitric acid solution, and 2.2 parts of pure water, a silica sol liquid (liquid B) having an $SiO_2$ (silicon oxide) solid content concentration of 10% and a weight average molecular weight of 1360 was obtained.

Then, by adding ethanol (EA), isopropyl alcohol (IPA), and propylene glycol monomethyl ether (PGM) to a mixture of 0.35 g of the liquid A and 1.4 g of the liquid B, a low-transmission transparent layer forming coating liquid containing the composite oxide fine particles of iron, manganese, and copper and an inorganic binder (Fe—Mn—Cu—O: 0.70%, $SiO_2$: 1.40%, water: 4.08%, EA: 54.47%, EA: IPA: 7.87%, and PGM: 30%) was prepared.

As the result of observing the low-transmission transparent layer forming coating liquid containing the composite oxide fine particles of iron, manganese, and copper observed by a transmission electron microscope, the mean particle size of the composite oxide fine particles of iron, manganese, and copper was 55 nm.

Then, after coating the low-transmission transparent layer forming coating liquid containing the composite oxide fine particles of iron, manganese, and copper and the inorganic binder on a glass substrate (soda lime glass of 3 mm in thickness) heated to 40° C. by spin coating (150 rpm, 60 seconds), the coated layer was further cured at 180° C. for 30 minutes to obtain the glass substrate having formed thereon a low-transmission transparent layer containing the composite oxide fine particles of iron, manganese, and copper and the binder matrix, that is, the low-transmission transparent layered structure of Example 1.

Figure 3:
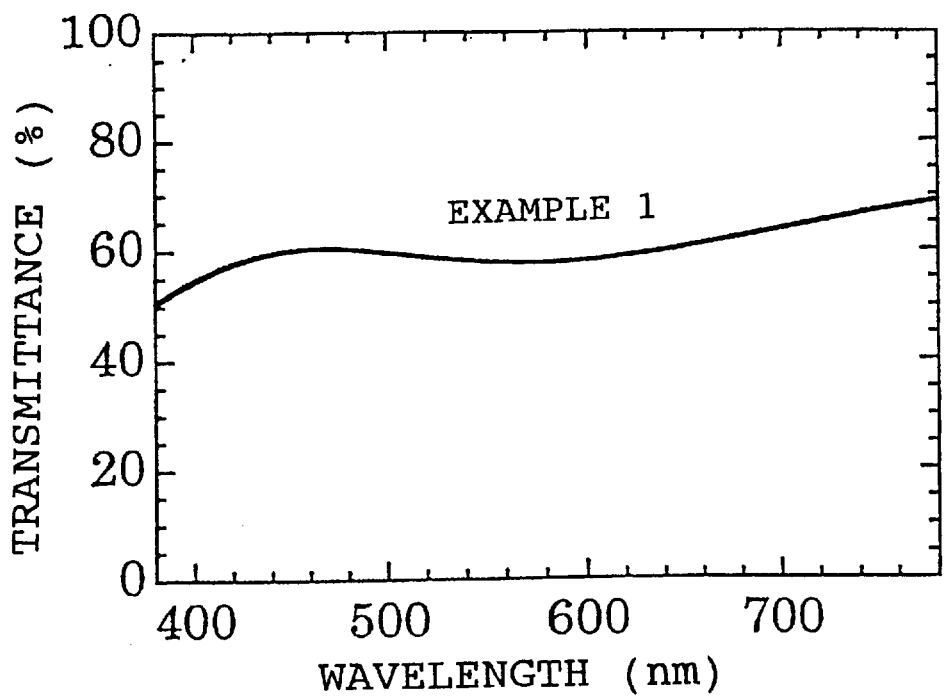
FIG. 3 is a graph showing the transmission profile of the low-transmission transparent layered structure of Example 1.

Also, the film characteristics (the transmittance the standard deviation of transmittance, and the haze value) of the low-transmission transparent layer formed on the glass substrate are shown in Table 1 described below. In addition, the transmission profile of the low-transmission transparent layer formed in Example 1 is shown in FIG. 1 and FIG. 3.

EXAMPLE 2

By following the same procedure as Example 1 except that using 0.35 g of the liquid A and 2.10 g of the liquid B prepared in Example 1, a low-transmission transparent layer forming coating liquid containing the composite oxide fine particles of iron, manganese, and copper and the inorganic binder (Fe—Mn—Cu—O: 0.70%, $SiO_2$: 2.10%, water: 4.78%, EA: 53.44%, IPA: 6.82%, and PGM: 30%) was prepared, a glass substrate having formed thereon a low-transmission transparent layer containing the composite oxide fine particles of iron, manganese, and copper and the binder matrix, that is, the low-transmission transparent layered structure of Example 2 was obtained.

Figure 4:
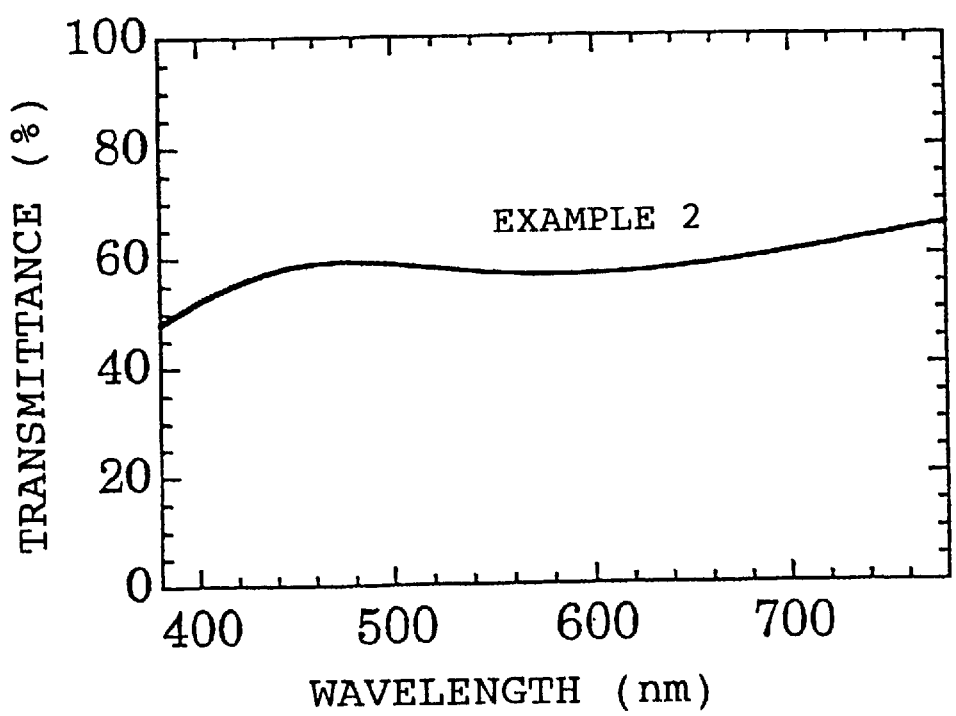
FIG. 4 is a graph showing the transmission profile of the low-transmission transparent layered structure of Example 2.

Also, the film characteristics of the low-transmission transparent layer formed on the glass substrate are shown in Table 1 below. Also, the transmission profile of the low-transmission transparent layer in Example 2 produced is shown in FIG. 4.

EXAMPLE 3

By following the same procedure as Example 1 except that using 0.35 g of the liquid A and 2.80 g of the liquid B prepared in Example 1, a low-transmission transparent layer forming coating liquid containing the composite oxide fine particles of iron, manganese, and copper and the inorganic binder (Fe—Mn—Cu—O: 0.70%, $SiO_2$: 2.80%, water: 5.48%, EA: 52.41%, IPA: 5.77%, and PGM: 30%) was prepared, a glass substrate having formed thereon a low-transmission transparent layer containing the composite oxide fine particles of iron, manganese, and copper and the binder matrix, that is, the low-transmission transparent layered structure of Example 3 was obtained.

Figure 5:
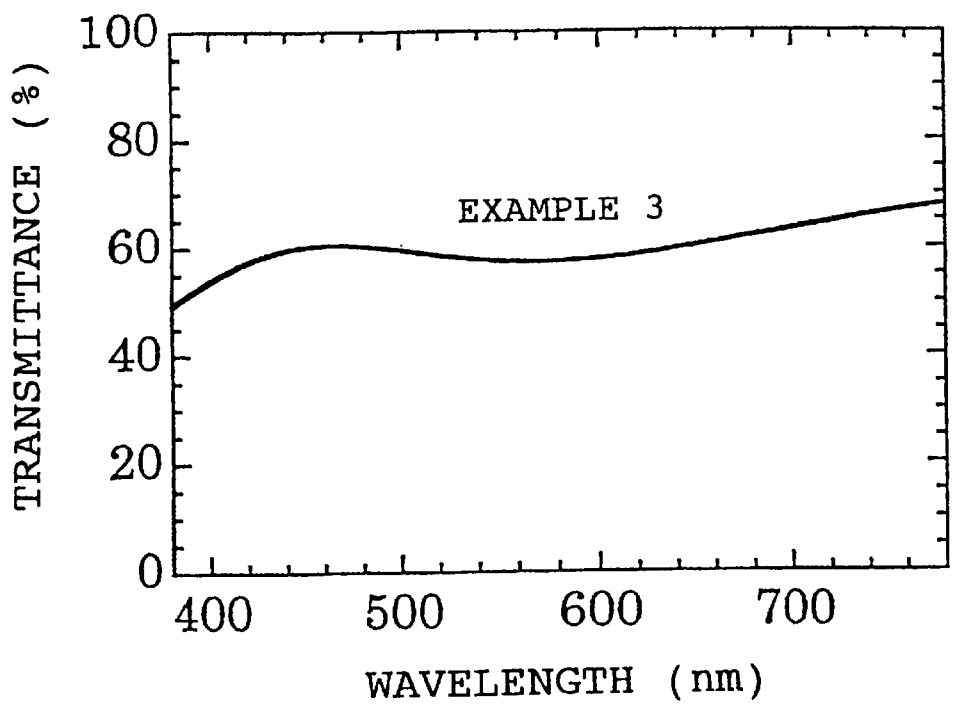
FIG. 5 is a graph showing the transmission profile of the low-transmission transparent layered structure of Example 3.

Also, the film characteristics of the low-transmission transparent layer formed on the glass substrate are shown in Table 1 below. Also, the transmission profile of the low-transmission transparent layer in Example 3 produced is shown in FIG. 5.

Comparative Example 1

By following the same procedure as Example 1 except that using carbon fine particles (MA-7, trade name, manufactured by Mitsubishi Chemical Corporation) were used in place of the composite oxide fine particles of iron, manganese, and copper in Example 1, a low-transmission transparent layer forming coating liquid containing the carbon fine particles and. the inorganic binder (carbon: 0.30%, $SiO_2$: 0.60%, water: 0.60%, EA: 4.21%, IPA: 88.66%, and PGM: 5.0) was prepared, a glass substrate having formed thereon a low-transmission transparent layer containing the carbon fine particles and the binder matrix, that is, the low-transmission transparent layered structure of Comparative Example 1 was obtained.

Also, the film characteristics of the low-transmission transparent layer formed on the glass substrate are shown in Table 1 below. Also, the transmission profile of the low-transmission transparent layer in Comparative Example 1 produced is shown in FIG. 1.

Comparative Example 2

By following the same procedure as Example 1 except that using 0.35 g of the liquid A and 0.70 g of the liquid B prepared in Example 1, a low-transmission transparent layer forming coating liquid containing the composite oxide fine particles of iron, manganese, and copper and the inorganic binder (Fe—Mn—Cu—O: 0.70%, $SiO_2$: 0.70%, water: 3.38%, EA: 55.50%, IPA: 8.92%, and PGM: 30.0%) was prepared, a glass substrate having formed thereon a low-transmission transparent layer containing composite oxide fine particles of iron, manganese, and copper and the binder matrix, that is, the low-transmission transparent layered structure of Comparative Example 2 was obtained.

Figure 6:
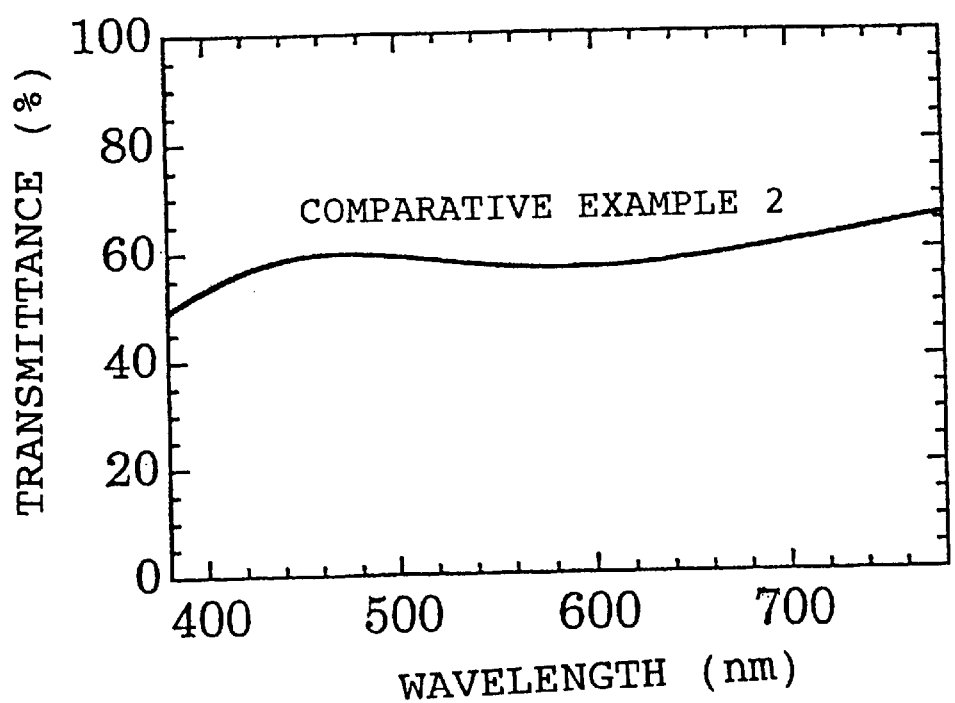
FIG. 6 is a graph showing the transmission profile of the low-transmission transparent layered structure of Comparative Example 2.

Also, the film characteristics of the low-transmission transparent layer formed on the glass substrate are shown in Table 1 below. Also, the transmission profile of the low-transmission transparent layer in Comparative Example 2 produced is shown in FIG. 6.

Comparative Example 3

The same procedure as Example 1 was followed except that using 0.35 g of the liquid A and 4.90 g of the liquid B prepared in Example 1, a low-transmission transparent layer forming coating liquid containing the composite oxide fine particles of iron, manganese, and copper and the inorganic binder (Fe—Mn—Cu—O: 0.70%, $SiO_2$: 4.90%, water: 7.58%, EA: 49.32%, IPA: 2.63%, and PGM: 30.0%) was prepared, but because the low-transmission transparent layer was peeled off from the glass. substrate at a heating treatment at 180° C. for 30 minutes after spin coating the layer, a low-transmission transparent layered structure could not be obtained.

TABLE 1

| | Kind of fine particles | Amount of binder matrix (*1) | Visible light transmission (%) | deviation of transmission (*2) | Haze value (%) |
|---|---|---|---|---|---|
| E1 | Fe—Mn—Cu—O | 200 | 57.9 | 3.84 | 0.8 |
| E2 | Fe—Mn—Cu—O | 300 | 57.4 | 3.36 | 0.6 |
| E3 | Fe—Mn—Cu—O | 400 | 58.0 | 3.78 | 0.6 |
| CE1 | Carbon | 200 | 57.2 | 6.55 | 1.0 |

TABLE 1-continued

|  | Kind of fine particles | Amount of binder matrix (*1) | Visible light transmission (%) | deviation of transmission (*2) | Haze value (%) |
|---|---|---|---|---|---|
| CE2 | Fe—Mn—Cu—O | 100 | 59.9 | 3.28 | 1.0 |
| CE3 | Fe—Mn—Cu—O | 700 | peel*3 | peel*3 | peel*3 |

E: Example,
CE: Comparative Example
*1: Weight parts of the binder matrix to 100 parts by weight of the composite oxide fine particles of iron, manganese, and copper.
*2: Standard deviation (%) to the transmission (%) of only the low-transmission transparent layer only without containing the transparent substrate in each wavelength every 5 nm of a visible light wavelength region (380 to 780 nm).
*3: The measurement was impossible because the film was peeled off from the transparent substrate.

Each of the low-transmission transparent layered structures obtained in Examples 1 to 3 and the low-transmission transparent layered structure obtained in Comparative Example 2 was immersed in an aqueous solution of 10% sodium chloride and an aqueous solution of 5% ammonia for 24 hours and the transmission and the appearance of the each low-transmission transparent layer formed on the transparent substrate (glass substrate) were investigated, but the changes were not observed in each case. Then, the similar test was carried out using an aqueous solution of 50% acetic acid and the results are shown in Table 2 below.

TABLE 2

| | Visible Light Transmission (%) | | low-transmission transparent layer |
|---|---|---|---|
| | Initial value | Value after immersing in aqueous 50% acetic acid solution | |
| Example 1 | 57.9 | 60.8 | No change |
| Example 2 | 57.4 | 57.9 | No change |
| Example 3 | 58.0 | 58.6 | No change |
| Comparative Example 2 | 59.9 | 83.4 | Brownish discolored |

EXAMPLE 4

After mixing 16 g of composite oxide fine particles of iron, manganese, and copper (TMB #3550, trade name, made by DAINICHISEIKA COLOR & CHEMICALS MFG. CO., LTD.) with 3.2 g of a dispersing agent and 60.8 g of pure water, the mixture was dispersed with zirconia beads in a paint shaker to obtain a dispersion (liquid C) of the composite fine particles of iron, manganese, and copper having a dispersed particle size of 92 nm.

By adding EA, IPA, and PGM to the liquid C, a low-transmission transparent layer-forming coating liquid of the composite oxide fine particles of iron, manganese, and copper (Fe—Mn—Cu—O: 0.70%, water: 2.7%. EA: 56.5%, IPA: 10.0%, and PGM: 30.0%) was prepared.

As the result of observing the low-transmission transparent layer-forming coating liquid of the composite oxide fine particles of iron, manganese, and copper by a transmission electron microscope, the mean particle size of the composite oxide fine particles of iron, manganese, and copper was 48 nm.

Then, after coating a low-transmission transparent layer forming coating liquid containing composite oxide fine particles of iron, manganese, and copper on a glass substrate (soda lime glass of 3 mm in thickness) heated to 40° C. by spin coating (150 rpm, 120 seconds), a silica sol liquid was successively coated thereon by spin coating (150 rpm, 60 seconds), and the coated layers were heated at 180° C. for 30 minutes to obtain the glass substrate having formed thereon a double layer film constituted of a low-transmission transparent layer containing composite oxide fine particles of iron, manganese, and copper and a transparent coat layer composed of a silicate film made of silicon oxide as the main constituent, that is, the low-transmission transparent layered structure of Example 4.

In this case, the silica sol liquid described above was obtained by preparing a silica sol liquid having a $SiO_2$ (silicon oxide) solid content concentration of 10% and a weight-average molecular weight of 1940 using 19.6 parts of methyl silicate 51 (trade name, manufactured by Colcoat Co., Ltd.), 57.8 parts of ethanol, 7.9 parts of an aqueous solution of 1% nitric acid, and 14.7 parts of pure water, and finally diluting the liquid with a mixture of IPA and n-butanol (NBA) (IPA/NBA=3/1) so that the $SiO_2$ solid content concentration became 1.0%.

Also, the film characteristics (the surface resistance, the transmittance, the standard deviation of the transmission, the haze value, and bottom reflectance/bottom wavelength) of the double layer film formed on the glass substrate are shown in Table 3 below.

Figure 2:
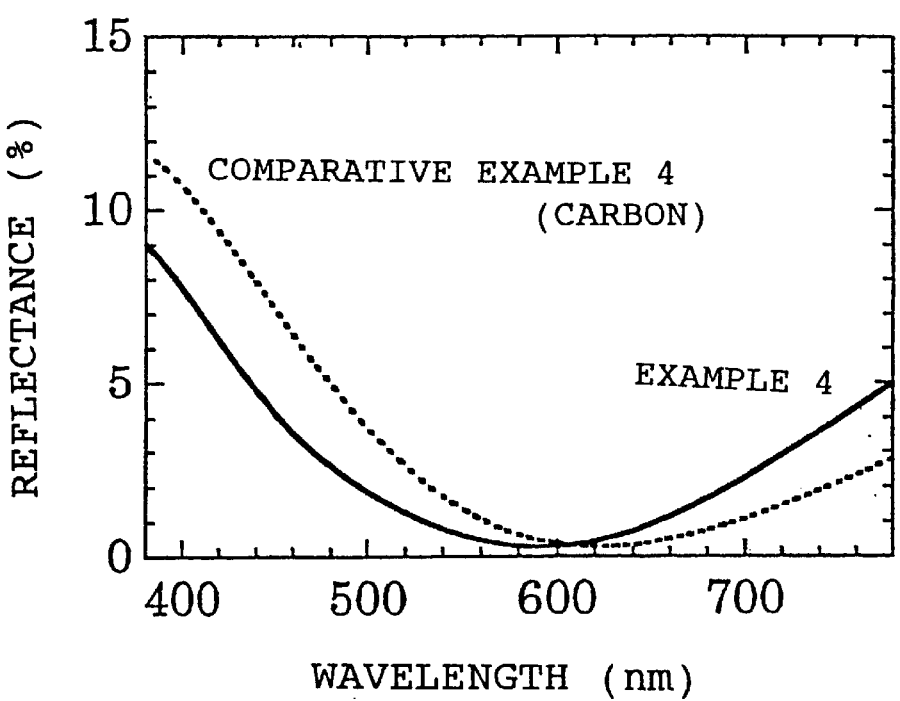
FIG. 2 is a graph: showing the reflection profiles of the low-transmission transparent layered structures of Example 4 and Comparative Example 4.
Figure 7:
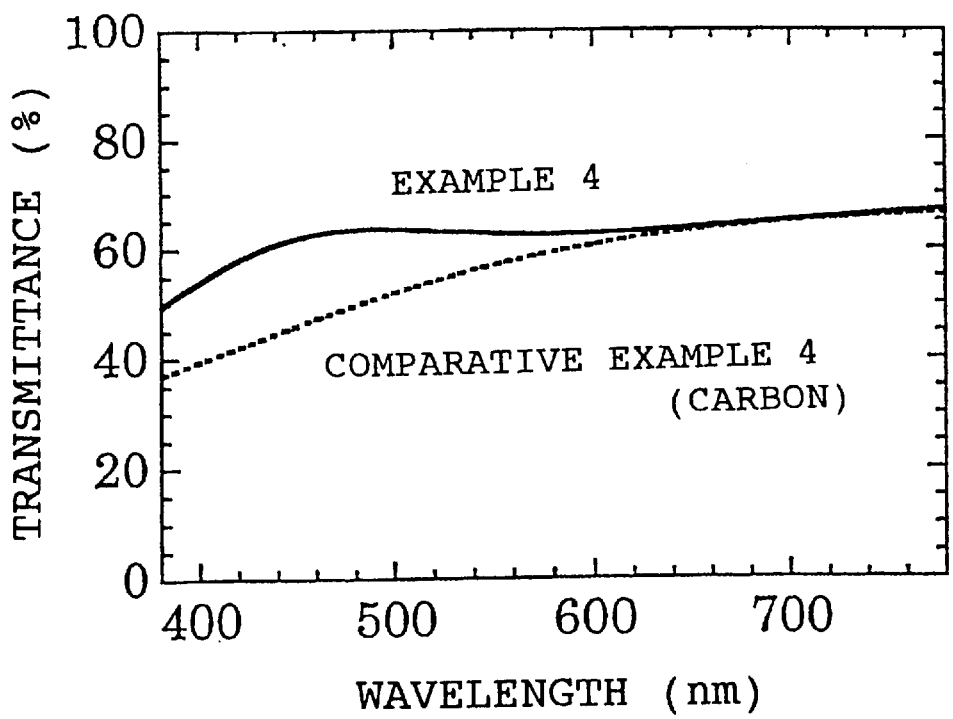
FIG. 7 is a graph showing the transmission profiles of the low-transmission transparent layered structures of Example 4 and Comparative Example 4.
Figure 8:
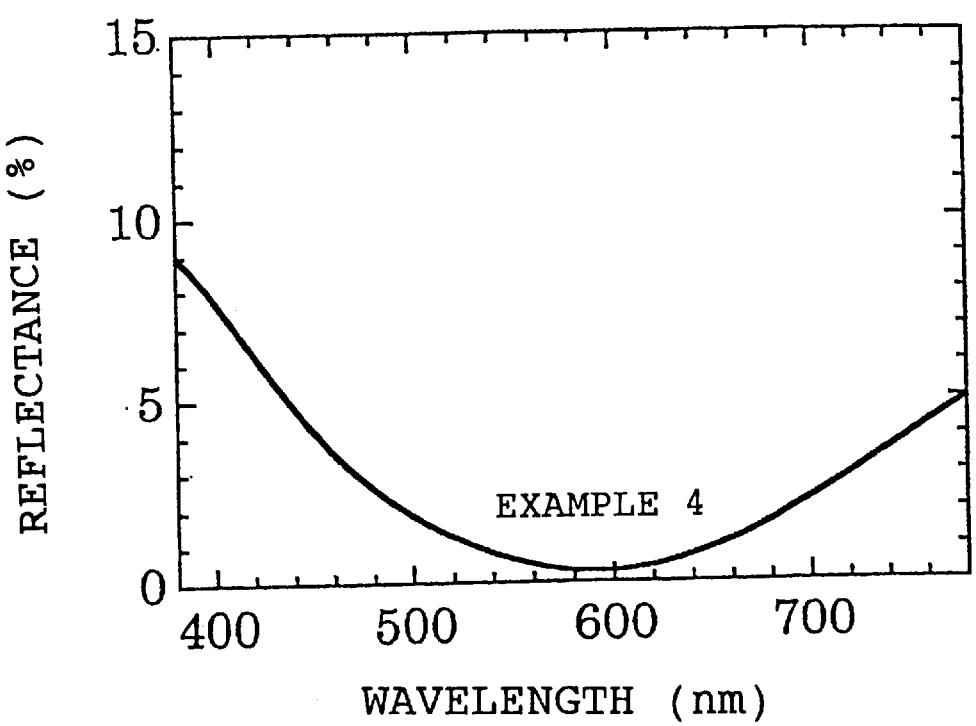
FIG. 8 is a graph showing the reflection profile of the low-transmission transparent:layered structure of Example 4.
Figure 9:
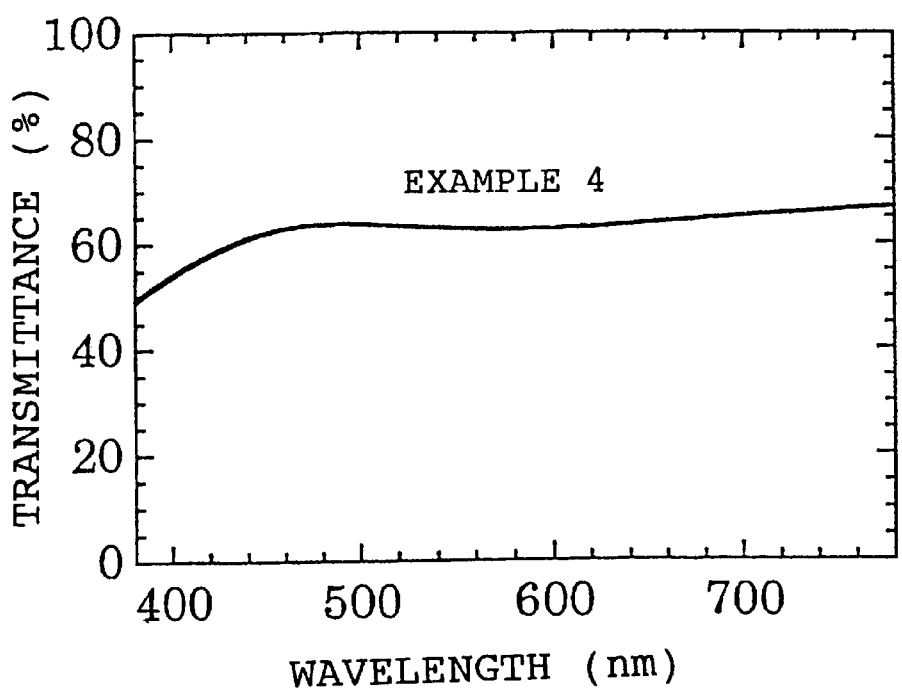
FIG. 9 is a graph showing the transmission profile of the low-transmission transparent layered structure of Example 4.

In addition, the term "bottom reflectance" described above means the minimum reflectance of a low-transmission transparent layered structure in the reflection profile and the term "bottom wavelength" means the wavelength in the minimum reflectance. Also, the reflection profile of the low-transmission transparent layered structure obtained in Example 4 is shown in FIG. 2 and FIG. 8 and the transmission profile thereof is shown in FIG. 7 and FIG. 9.

EXAMPLE 5

By following the same procedure as Example 4 except that curing was carried out at 450° C. for 30 minutes, a glass substrate having formed thereon a double layer film constituted of a low-transmission transparent layer containing composite fine particles of iron, manganese, and copper and a transparent coat layer composed of a silicate film made of silicon oxide as the main constituent, that is, the low-transmission transparent layered structure of Example 5 was obtained.

Figure 10:
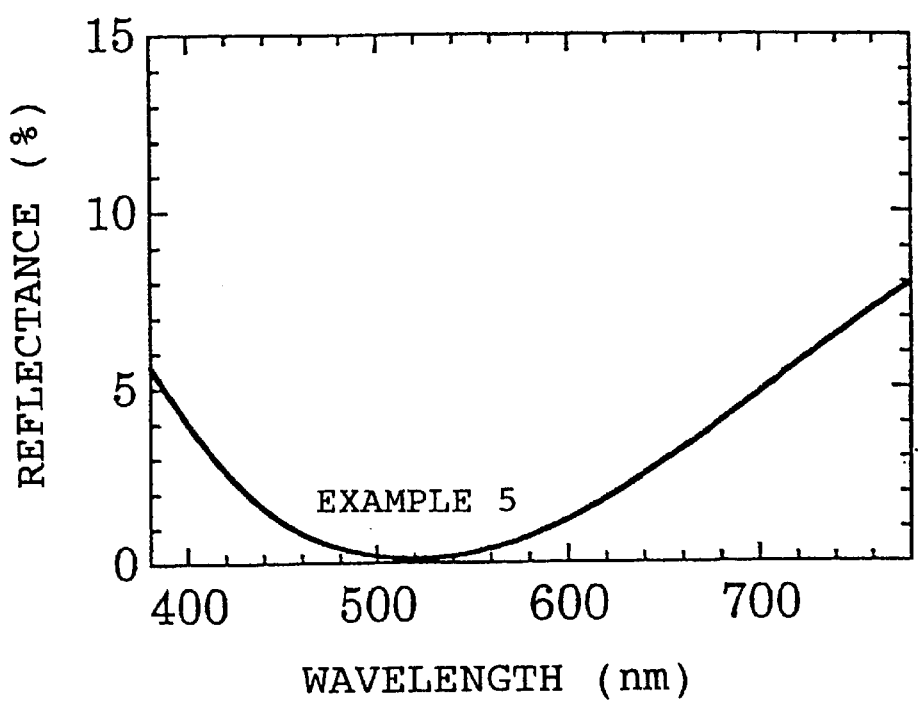
FIG. 10 is a graph showing the reflection profile of the low-transmission transparent layered structure of Example 5.
Figure 11:
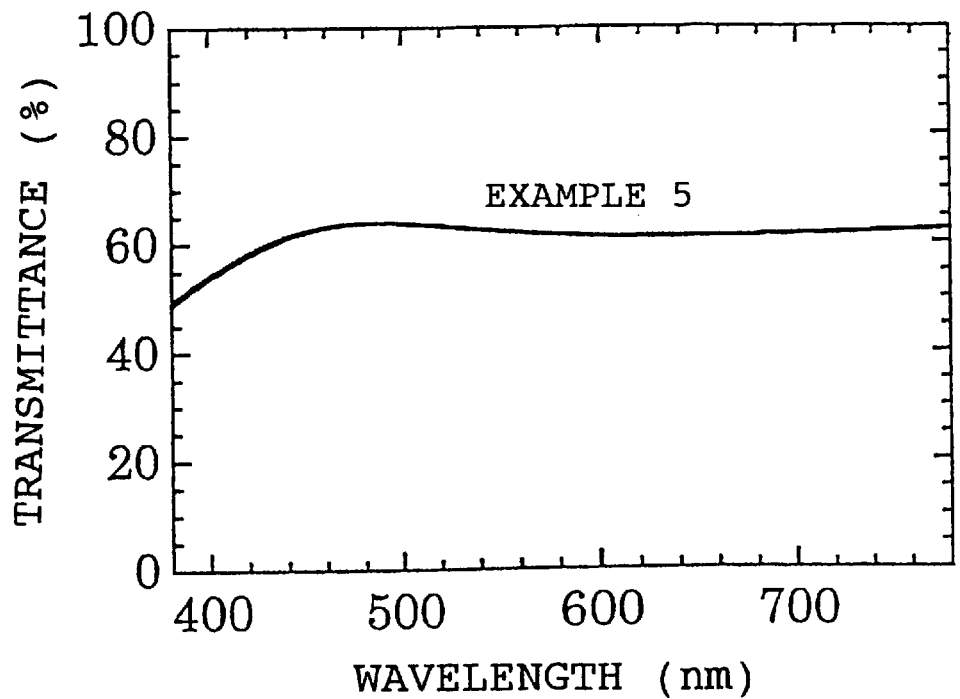
FIG. 11 is a graph showing the transmission profile of the low-transmission transparent layered structure of Example 5.

Also, the film characteristics of the double layer film formed on the glass substrate are shown in Table 3 below. Furthermore, the reflection profile of the low-transmission transparent layered structure of Example 5 produced is shown in FIG. 10 and the transmission profile thereof is shown in FIG. 11.

EXAMPLE 6

By following the same procedure as Example 4 except that by mixing 0.35 g of the liquid C of Example 4 and 0.7 g of the liquid B in Example 1, a coating liquid having dispersed therein composite oxide fine particles of iron, manganese, and copper having a dispersed particle size of 98 nm (Fe—Mn—Cu—O: 0.70%, $SiO_2$: 0.70%, water: 3.40%. EA: 55.60%, IPA: 8.90%, and PGM: 30.0%) was prepared, a glass substrate having formed thereon a double layer film constituted of a low-transmission transparent layer containing the composite oxide fine particles of iron, manganese, and, copper and a transparent coat layer composed of a silicate film made of silicon oxide as the main constituent, that is, the low-transmission transparent layered structure of Example 6 was obtained.

Figure 12:
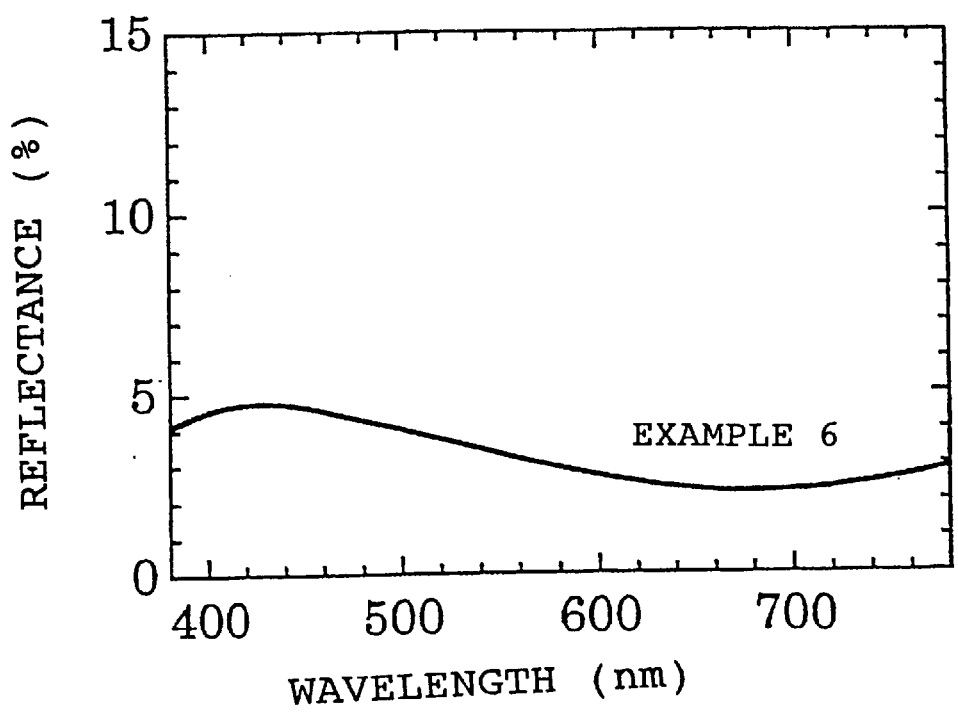
FIG. 12 is a graph showing the reflection profile of the low-transmission transparent layered structure of Example 6.
Figure 13:
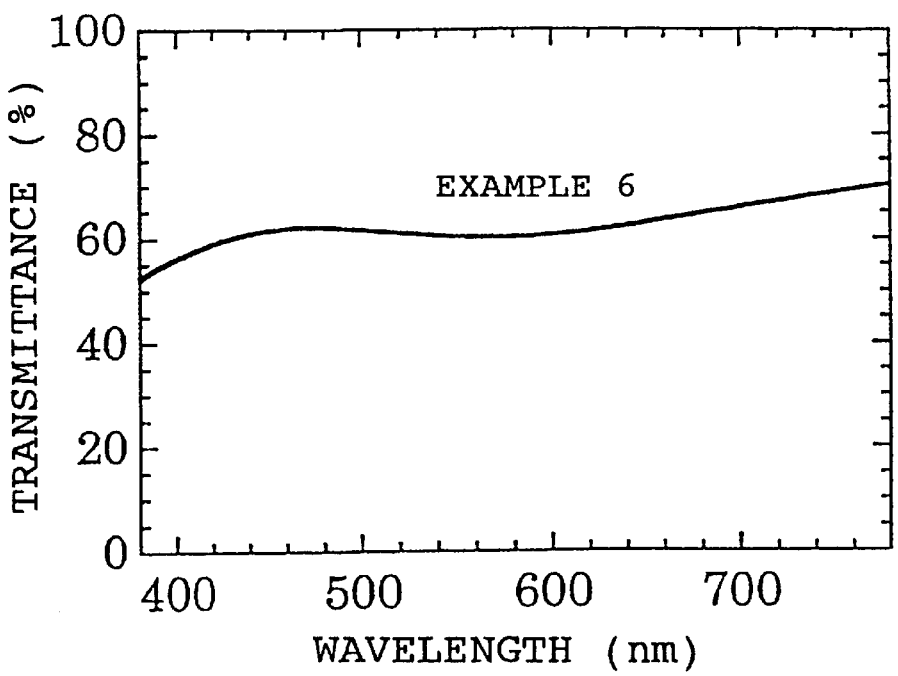
FIG. 13 is a graph showing the transmission profile of the low-transmission transparent layered structure of Example 6.

The film characteristics of the double layer film formed on the glass substrate are shown in Table 3 below. Also, the reflection profile of the low-transmission transparent layered structure of Example 6 produced is shown in FIG. 12 and the transmission profile thereof is shown in FIG. 13.

Comparative Example 4

By following the same procedure as Example 4 except that using carbon fine particles (MA-7, trade name, manufactured by Mitsubishi Chemical Corporation) in place of the composite oxide fine particles of iron, manganese, and copper in Example 4, a low-transmission transparent layer forming coating liquid having dispersed therein the carbon fine particles having a dispersed particle size of 40 nm (carbon: 0.30%, EA: 57.0%, IPA: 12.70%, and PGM: 30.0%) was prepared, a glass substrate having formed thereon a double layer film constituted of a low-transmission transparent layer containing the carbon fine particles and a transparent coat layer composed of a silicate film made of silicon oxide as, the main constituent, that is, the low-transmission transparent layered structure of Comparative Example 4 was obtained.

Also, the film characteristics of the low-transmission transparent layer formed on the glass substrate are shown in Table 3 below. Also, the reflection profile of the low-transmission transparent layered structure of Comparative Example 4 produced is shown in FIG. 2, and the transmission profile thereof is shown in FIG. 7.

Comparative Example 5

By following the same procedure as Example 4 except that the transparent coat layer composed of the silicate film made of silicon oxide as the main constituent in Example 4 was not formed, a glass substrate having formed thereon a low-transmission transparent layer made of a single layer film constituted of a low-transmission transparent layer containing composite oxide fine particles of iron, manganese, and copper, that is, the low-transmission transparent layered structure of Comparative Example 5 was obtained.

Figure 14:
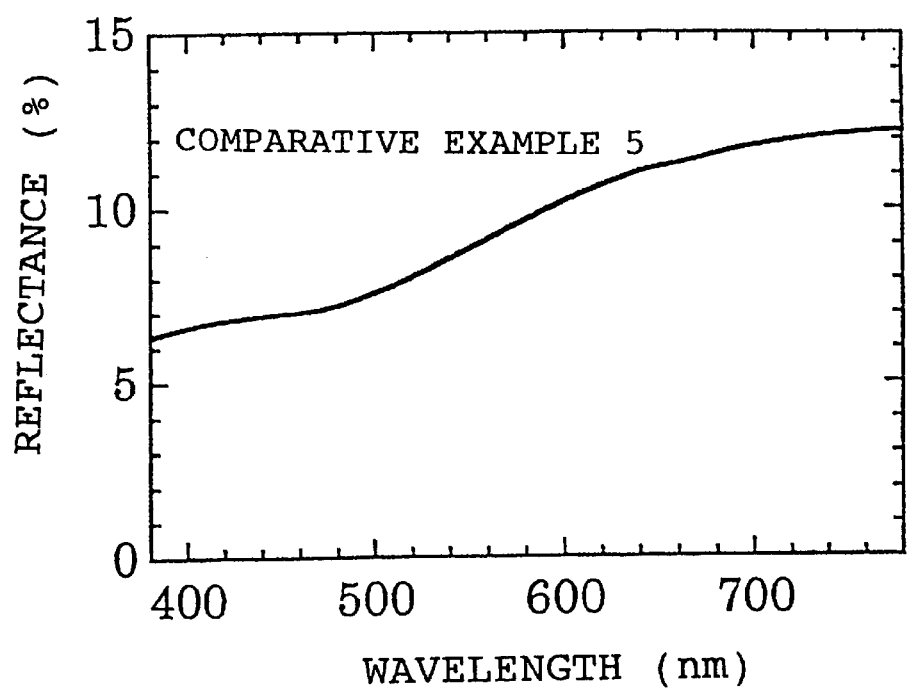
FIG. 14 is a graph showing the reflection profile of the low-transmission transparent layered structure of Comparative Example 5.
Figure 15:
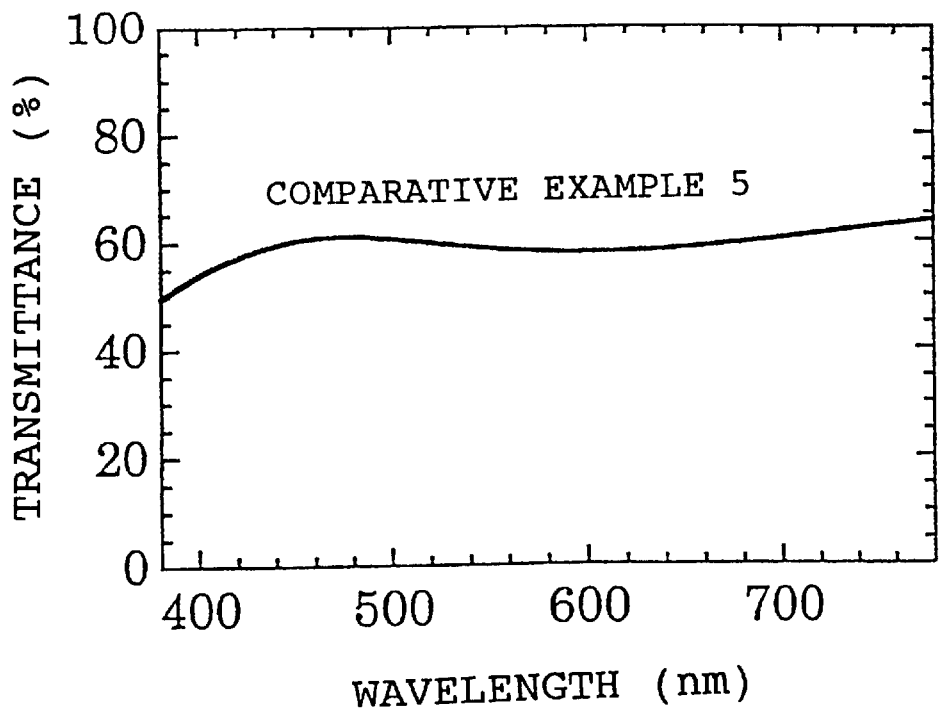
FIG. 15 is a graph showing the transmission profile of the low-transmission transparent layered structure of Example 5.

Also, the film characteristics of the low-transmission transparent layer formed on the glass substrate are shown in Table 3 below. Also, the reflection profile of the low-transmission transparent layered structure of Comparative Example 5 produced is shown in FIG. 14, and the transmission profile thereof is shown in FIG. 15.

TABLE 3

| | Kind of fine particles | Transmission of visible light (%) | Standard deviation of transmission (*4) | Haze value (%) | Bottom reflectance (%)/bottom wavelength (nm) |
|---|---|---|---|---|---|
| E4 | Fe—Mn—Cu—O | 62.7 | 3.55 | 0.6 | 0.29/590 |
| E5 | Fe—Mn—Cu—O | 62.4 | 2.88 | 0.6 | 0.13/520 |
| E6 | Fe—Mn—Cu—O | 60.2 | 3.78 | 1.0 | 2.24/675 |
| CE4 | Carbon | 57.1 | 8.94 | 0.6 | 0.29/620 |
| CE5 | Fe—Mn—Cu—O | 58.9 | 2.58 | 1.0 | — |

E: Example,
CE: Comparative Example
*4: Standard deviation (%) to the transmission (%) of the double layer film only or the single layer film only without containing the transparent substrate in each wavelength every 5 nm of a visible light wavelength region (380 to 780 nm).

Each of the low-transmission transparent layered structures obtained in Examples 4 to 6 and the low-transmission transparent layered structure obtained in Comparative Example 5 was immersed in an aqueous solution of 10% sodium chloride and an aqueous solution of 5% ammonia for 24 hours and the transmission and the appearance of the each low-transmission transparent layer formed on the transparent substrate (glass substrate) were investigated but the changes were not observed in each case. Then, the similar test was carried out using an aqueous solution of 50% acetic acid and the results are shown in Table 4 below.

| | Visible Light Transmittance (%) | | Appearance of double layer film or single layer film |
|---|---|---|---|
| | Initial value | Value after immersing in aqueous 50% acetic acid solution | |
| Example 4 | 62.7 | 64.9 | No change |
| Example 5 | 62.4 | 68.2 | No change |
| Example 6 | 60.2 | 62.0 | No change |
| Comparative Example 5 | 58.9 | 87.5 | Brownish discolored |

EXAMPLE 7

Titanium hydroxide obtained by hydrolyzing titanium chloride with an aqueous alkali solution was treated in an ammonia gas at 800° C. to obtain black titanium oxynitride fine particles (nitrogen: 15.5%).

After mixing 8 g of the black titanium oxynitride fine particles with 1.6 g of a dispersing agent and 70.4 g of pure water, the mixture was dispersed with zirconium beads in a paint shaker to obtain a dispersion (liquid D) of the black titanium oxynitride fine particles having a dispersed particle size of 135 nm.

Then, after mixing 8 g of carbon fine particles (MA-7, trade name, manufactured by Mitsubishi Chemical Corporation) with 1.2 g of a dispersing agent and 70.80 g of IPA, the mixture was dispersed with carbon fine particles having a dispersed mean size of 100 nm.

By adding EA, IPA, and PGM to a mixture of 0.60 g of the liquid D and 0.32 g of the liquid E, a low-transmission transmittance layer forming coating liquid a containing the carbon fine particles and the black titanium compound fine particles (carbon: 0.16%, black titanium oxynitride: 0.30%, water: 2.64%, EA: 55.59%, IPA: 11.23%, and PGM: 30.0%) was prepared.

As the result of observing the low-transmission transparent layer forming coating liquid containing the carbon fine particles and the black titanium compound fine particles obtained by a transmission electron microscope, the mean particle size of each of the carbon fine particles and the black titanium fine particles was 40 nm and 55 nm, respectively.

Then, by following the same procedure as Example 4 except that the low-transmission transparent layer forming coating liquid containing the carbon fine particles and the black titanium compound fine particles was used, a glass substrate having formed thereon a double layer film constituted of the low-transmission transparent layer containing the carbon fine particles and the black titanium compound fine particles and a transparent coat layer composed of a silicate layer made of silicon oxide as the main constituent, that is, the low-transmission transparent layered structure of Example 7 was obtained.

Figure 16:
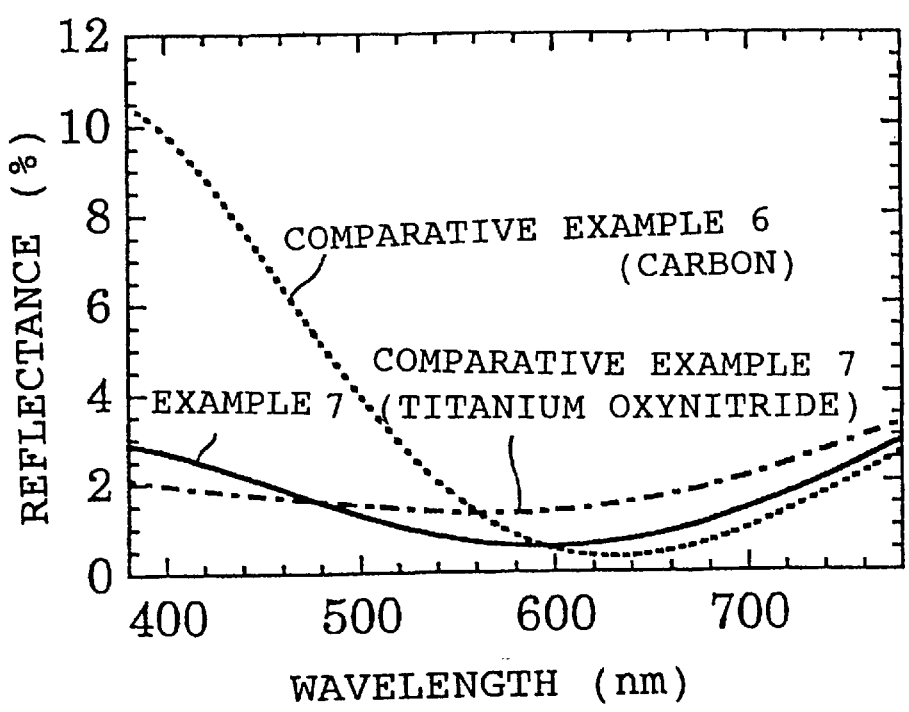
FIG. 16 is a graph showing the reflection profiles of the low-transmission transparent layered structures of Example 7 and Comparative Examples 6 and 7.
Figure 17:
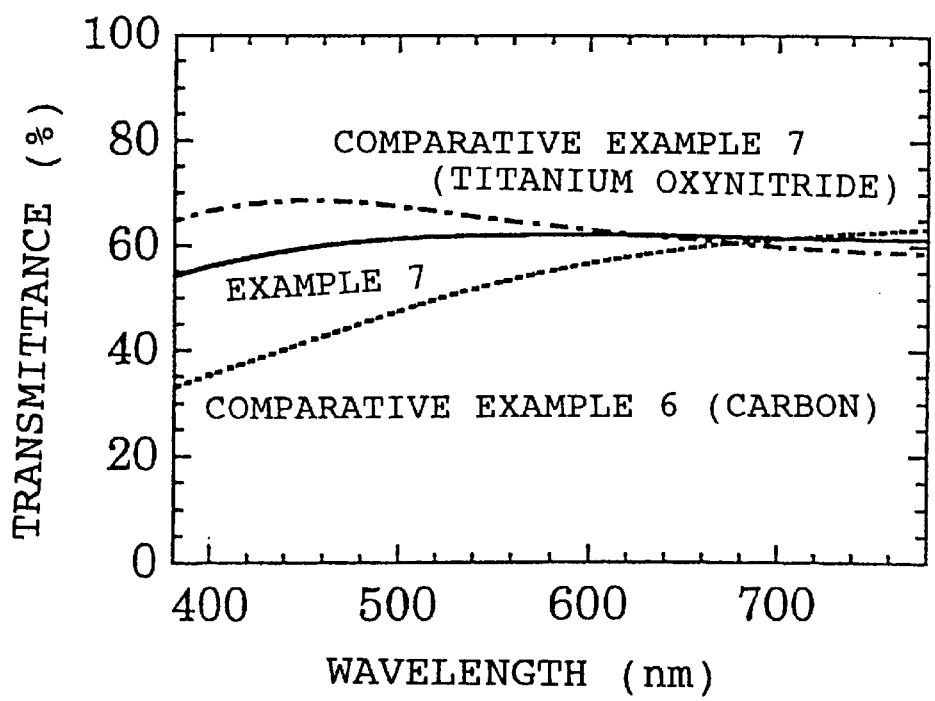
FIG. 17 is a graph showing the transmission profiles of the low-transmission transparent layered structures of Example 7 and Comparative Examples 6 and 7.
Figure 18:
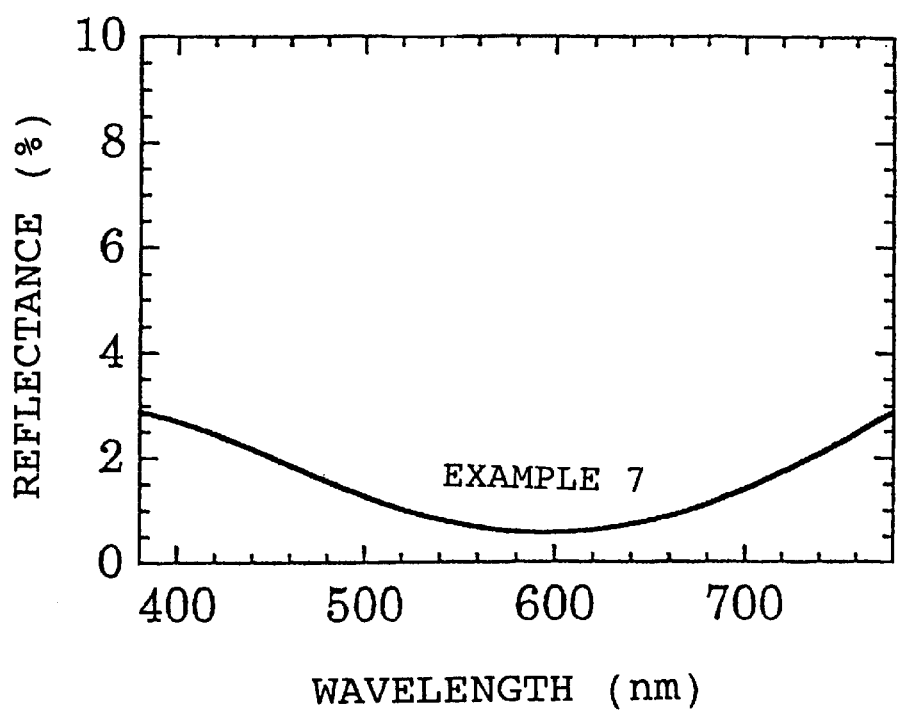
FIG. 18 is a graph showing the reflection profile of the low-transmission transparent layered structure of Example 7.
Figure 19:
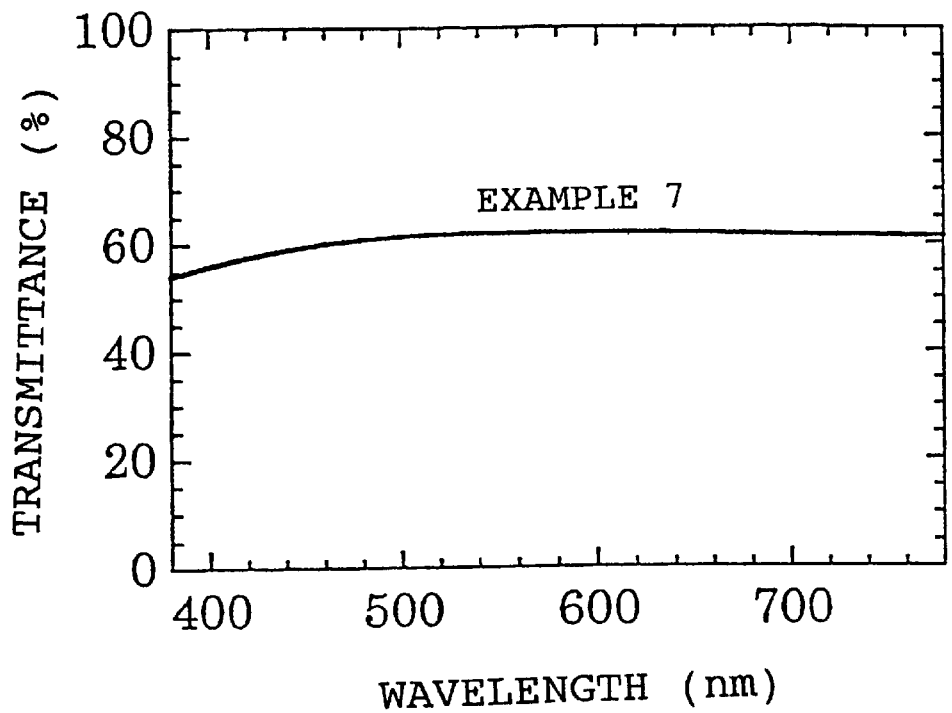
FIG. 19 is a graph showing the transmission profile of the low-transmission transparent layered structure of Example 7.

Also, the film characteristics (the surface resistance, the transmittance, the standard deviation of the transmittance, the haze value, and bottom reflectance/bottom wavelength) of the double layer film formed on the glass substrate are shown in Table 5 below. Also, the reflection profile of the low-transmission transparent layered structure of Example 7 is shown in FIG. 16 and FIG. 18, and the transmission profile thereof is shown in FIG. 17 and FIG. 19.

EXAMPLE 8

By following the same procedure as Example 7 except that using 0.45 g of the liquid D and 0.08 g of the liquid E each prepared in Example 7, a low-transmission transparent layer forming coating liquid containing the carbon fine particles and the black titanium compound fine particles (carbon: 0.08%, black titanium oxynitride: 0.45%, water: 3.96%, EA: 55.0%, IPA: 10.41%, and PGM: 30.0%) was prepared, a glass substrate having formed thereon a double layer film constituted of a low-transmission transparent layer containing the carbon fine particles and the black titanium compound fine particles and a transparent coat layer composed of a silicate film made of silicon oxide as the main constituent, that is, the low-transmission transparent layered structure of Example 8 was obtained.

Figure 20:
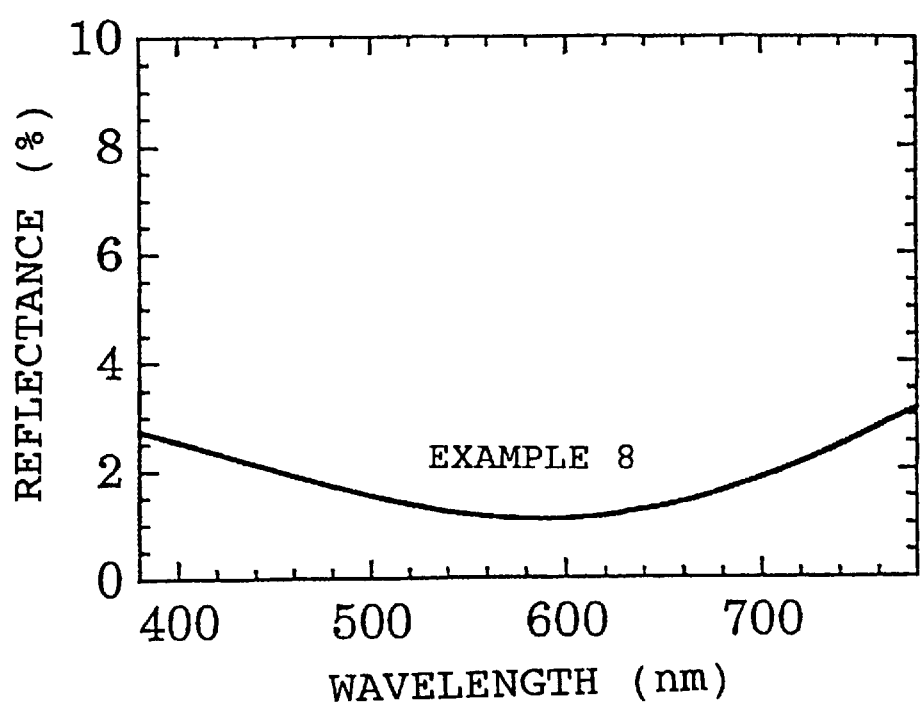
FIG. 20 is a graph showing the reflection profile of the low-transmission transparent layered structure of Example 8.
Figure 21:
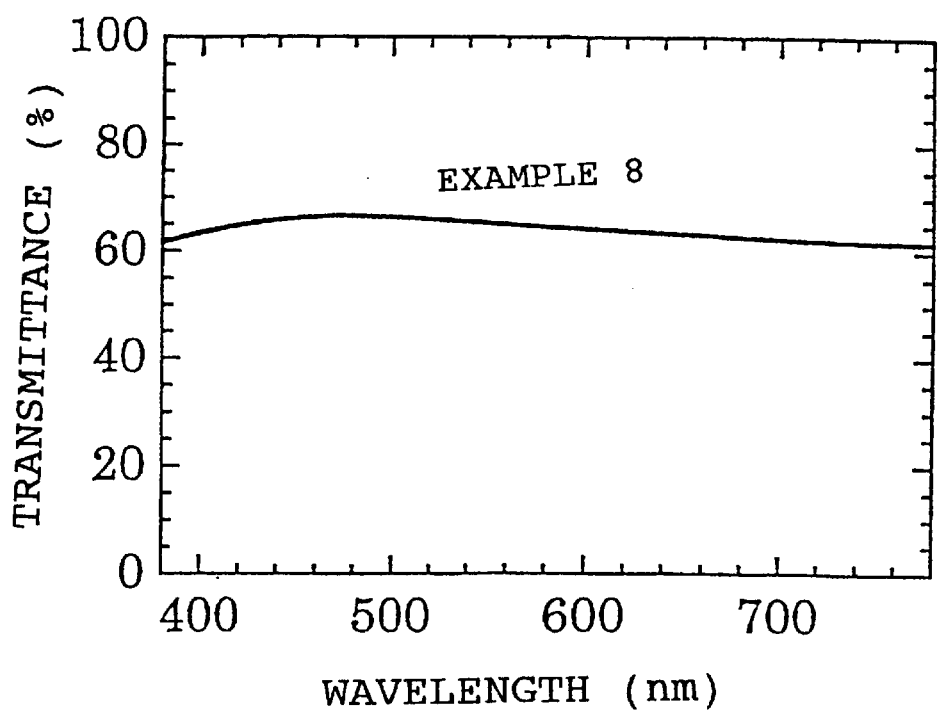
FIG. 21 is a graph showing the transmission profile of the low-transmission transparent layered structure of Example 8.

Also, the film characteristics of the double layer film formed on the glass substrate are shown in Table 5 below. Also, the reflection profile of the low-transmission transparent layered structure of Example 8 is shown in FIG. 20 and the transmission profile thereof is shown in FIG. 21.

EXAMPLE 9

By following the same procedure as Example 7 except that after mixing 8 g of black titanium sub-oxide (Tilack D, trade name, manufactured by Ako Kasei Co., Ltd.) with 0.7 g of a dispersing agent and 71.3 g of diacetone alcohol (DM), the mixture was dispersed with zirconia beads in a paint shaker to obtain a dispersion (liquid F) of the black titanium oxide fine particles having a dispersed particle size of 125 nm, and using 1.8 g of the liquid F and 0.08 g of the liquid E, a low-transmission transparent layer forming coating liquid containing the carbon fine particles and the black titanium compound fine particles (carbon: 0.08%, black titanium oxide: 1.80%, EA: 43.52%, IPA: 8.39%, DAA: 16.04%, and PGM: 30.0%) was prepared, a glass substrate having formed thereon a double layer film constituted of a low-transmission transparent layer containing the carbon fine particles and the black titanium compound fine particles and a transparent coat layer composed of a silicate film made of silicon oxide as the main constituent, that is, the low-transmission transparent layered structure of Example 9 was obtained.

Figure 22:
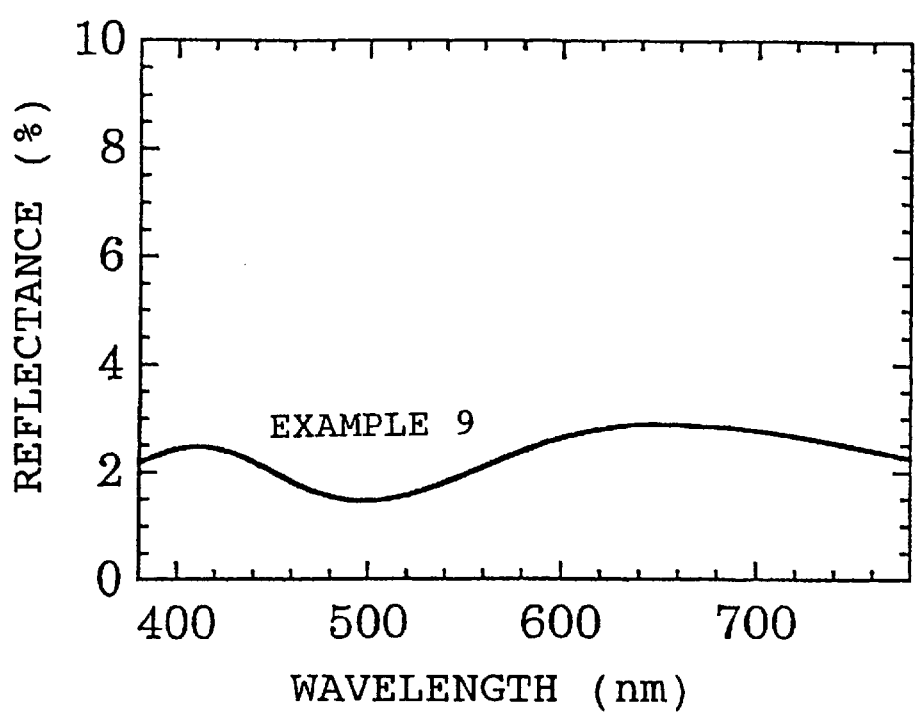
FIG. 22 is a graph showing the reflection profile of the low-transmission transparent layered structure of Example 9.
Figure 23:
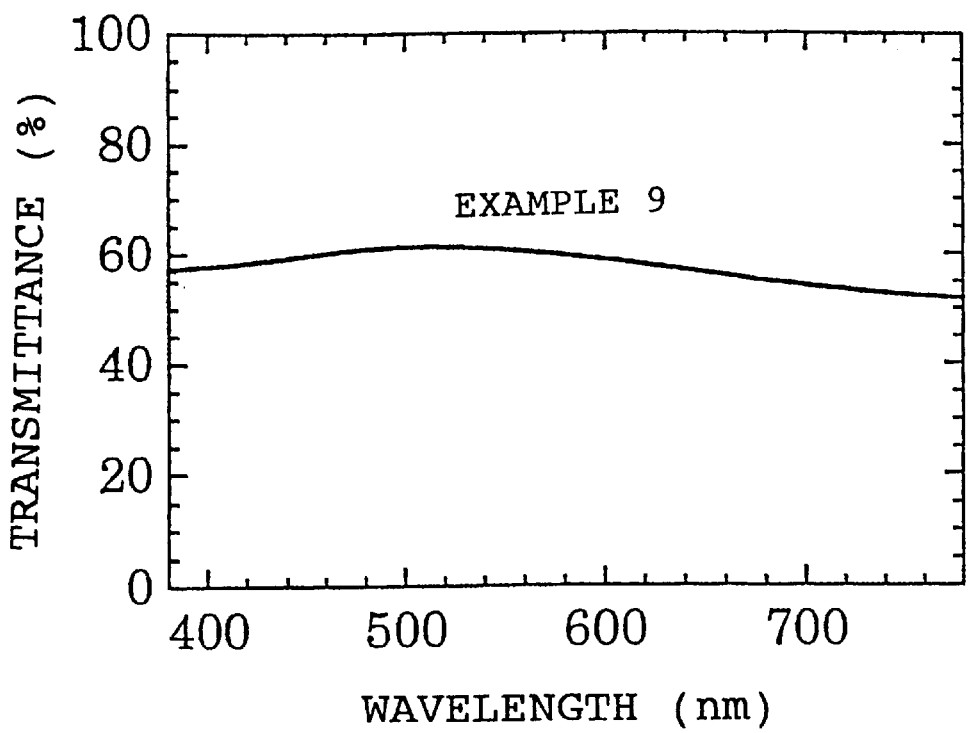
FIG. 23 is a graph showing the transmission profile of the low-transmission transparent layered structure of Example 9.

Also, the film characteristics of the double layer film formed on the glass substrate are shown in Table 5 below. Also, the reflection profile of the low-transmission transparent layered structure of Example 9 is shown in FIG. 22 and the transmission profile thereof is shown in FIG. 23.

EXAMPLE 10

By following the same procedure as Example 7 except that by mixing 0.3 g of the liquid D and 0.16 g of the liquid E in Example 7 with 0.46 g of the liquid B in Example 1, a low-transmission transparent layer forming coating liquid containing the carbon fine particles, the black titanium compound fine particles, and the silica sol (carbon: 0.16%, black titanium oxynitride: 0.30%, $SiO_2$: 0.46%, water: 3.10%, EA: 54.91%, IPA: 10.54%, and PGM: 30.0%) was prepared, a glass substrate having formed thereon a double layer film constituted of a low-transmission transparent layer containing the carbon fine particles and the black titanium compound fine particles and a transparent coat layer composed of a silicate film made of silicon oxide as the main constituent, that is, the low-transmission transparent layered structure of Example 10 was obtained.

Figure 24:
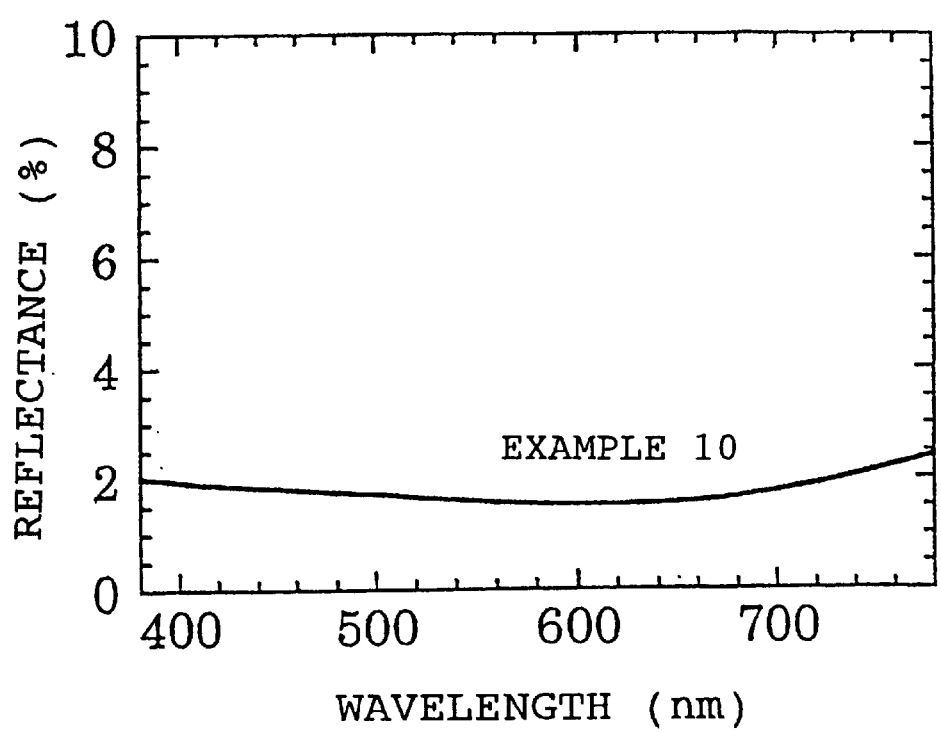
FIG. 24 is a graph showing the reflection profile of the low-transmission transparent layered structure of Example 10.
Figure 25:
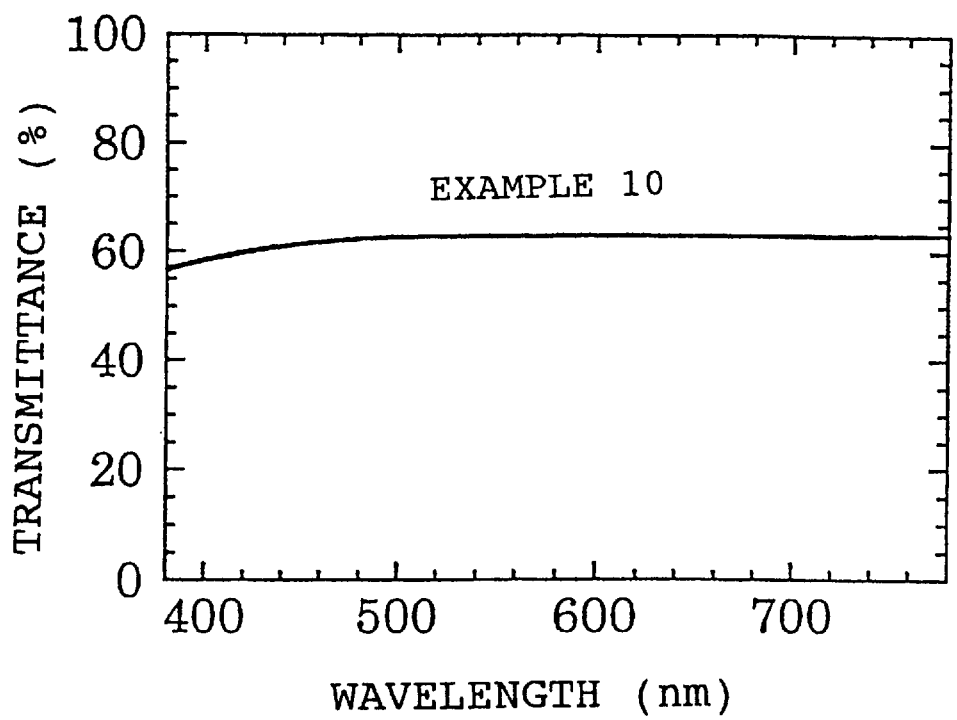
FIG. 25 is a graph showing the transmission profile of the low-transmission transparent layered structure of Example 10.

Also, the film characteristics of the double layer film formed on the glass substrate are shown in Table 5 below. Also, the reflection profile of the low-transmission transparent layered structure of Example 10 is shown in FIG. 24 and the transmission profile thereof is shown in FIG. 25.

Comparative Example 6

By following the same procedure as Example 7 except that using carbon fine particles (MA-7, trade name, manufactured by Mitsubishi Chemical Corporation) in place of the carbon fine particles and the black titanium compound fine particles used in Example 7, a low-transmission transparent layer forming coating liquid having dispersed therein the carbon fine particles having a dispersed particle size of 40 nm (carbon: 0.32%, EA: 56.78%, IPA: 11.95%, and PGM: 30.0%) was prepared, a glass substrate having formed thereon a double layer film constituted of a low-transmission transparent layer containing the carbon fine particles and a transparent coat layer composed of a silicate film made of silicon oxide as the main constituent, that is, the low-transmission transparent layered structure of Comparative Example 6 was obtained.

Also, the film characteristics of the double layer film formed on the glass substrate are shown in Table 5 below. Also, the reflection profile of the low-transmission transparent layered structure of Comparative Example 6 is shown in FIG. 16 and the transmission profile thereof is shown in FIG. 17.

Comparative Example 7

By following the same procedure as Example 7 except that using the black titanium oxynitride fine particles used in Example 7 in place of the carbon fine particles and the black titanium compound fine particles in Example 7, a low-transmission transparent layer forming coating liquid having dispersed therein the black titanium oxynitride fine particles having a dispersed particle size of 55 nm (black titanium oxynitride fine particles: 0.60%, water: 5.28%, EA: 54.40%, IPA: 9.60%, and PGM: 30.0%) was prepared, a glass substrate having formed thereon a double layer film constituted of a low-transmission transparent layer containing the black titanium oxynitride fine particles and a transparent coat layer composed of a silicate film made of silicon oxide as the main constituent, that is, the low-transmission transparent layered structure of Comparative Example 7 was obtained.

Also, the film characteristics of the double layer film formed on the glass substrate are shown in Table 5 below. Also, the reflection profile of the low-transmission transparent layered structure of Comparative Example 7 is shown in FIG. 16 and the transmission profile thereof is shown in FIG. 17.

Comparative Example 8

By following the same procedure as Example 7 except that using 0.15 g of the liquid D and 0.24 g of the liquid E each prepared in Example 7, a low-transmission transparent layer forming coating liquid containing the carbon fine particles and the black titanium compound fine particles (carbon: 0.24%, black titanium oxynitride: 0.15%, water: 1.32%, EA: 56.19%, IPA: 12.04%, and PGM: 30.0%) was prepared, a glass substrate having formed thereon a double layer film constituted of a low-transmission transparent layer containing the carbon fine particles and the black titanium compound fine particles and a transparent coat layer composed of a silicate film made of silicon oxide as the main constituent, that is, the low-transmission transparent layered structure of Comparative Example 8 was obtained.

Figure 26:
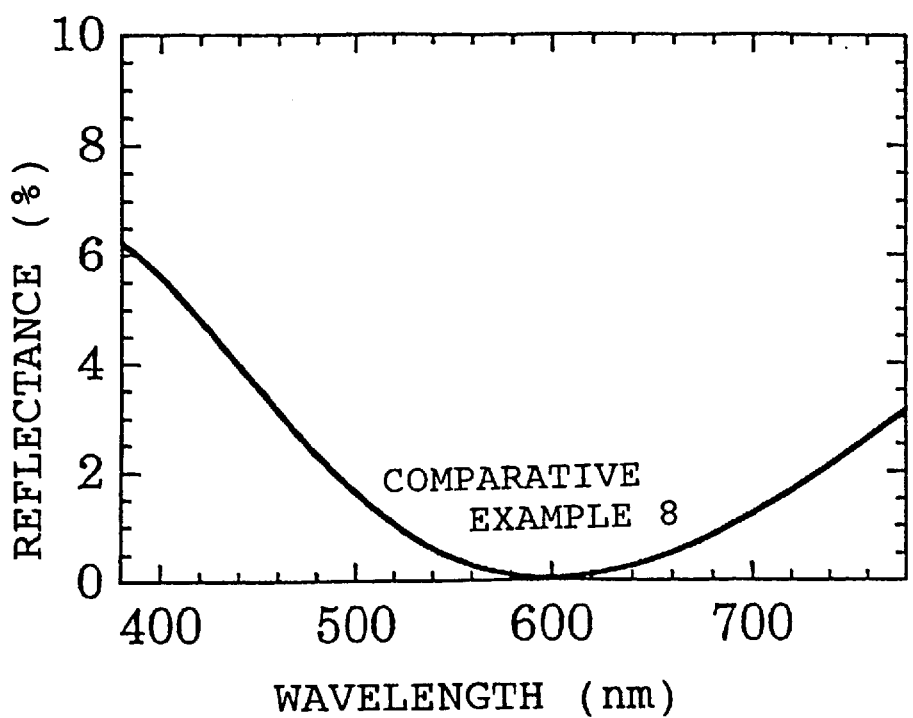
FIG. 26 is a graph showing the reflection profile of the low-transmission transparent layered structure of Comparative Example 8.
Figure 27:
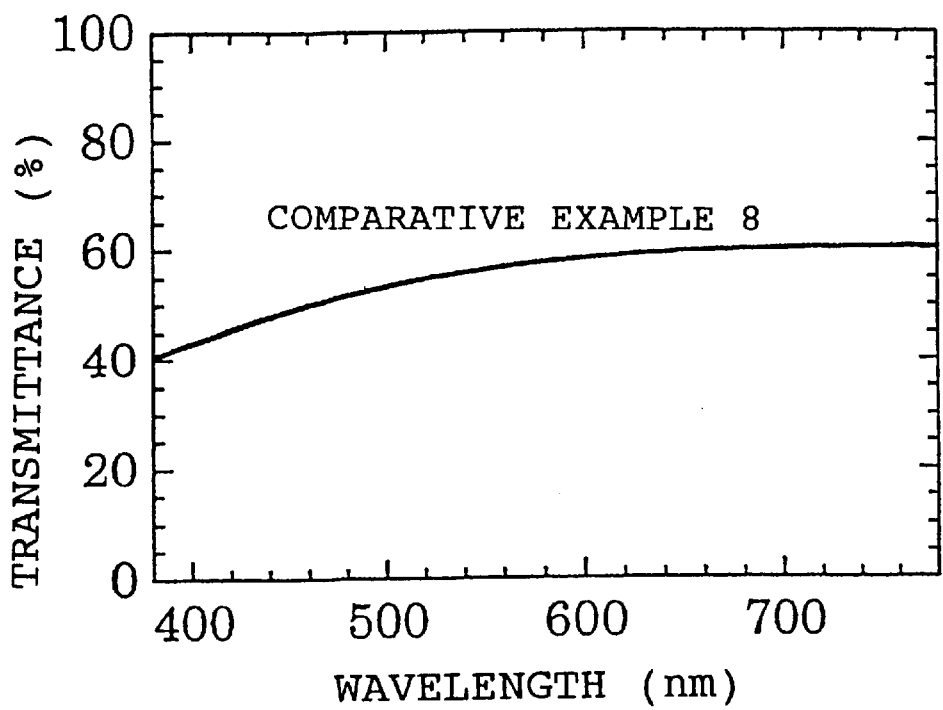
FIG. 27 is a graph showing the transmission profile of the low-transmission transparent layered structure of Comparative Example 8.

Also, the film characteristics of the double layer film formed on the glass substrate are shown in Table 5 below. Also, the reflection profile of the low-transmission transparent layered structure of Comparative Example 8 is shown in FIG. 26 and the transmission profile thereof is shown in FIG. 27.

Comparative Example 9

By following the same procedure as Example 7 except that the formation of the transparent coat layer composed of the silicate film made of silicon oxide as the main constituent in Example 7 was not carried out, the glass substrate having formed thereon a low-transmission transparent layer made of a single layer film containing the carbon fine particles and the black titanium compound fine particles, that is, the low-transmission transparent layered structure of Comparative Example 9 was obtained.

Figure 28:
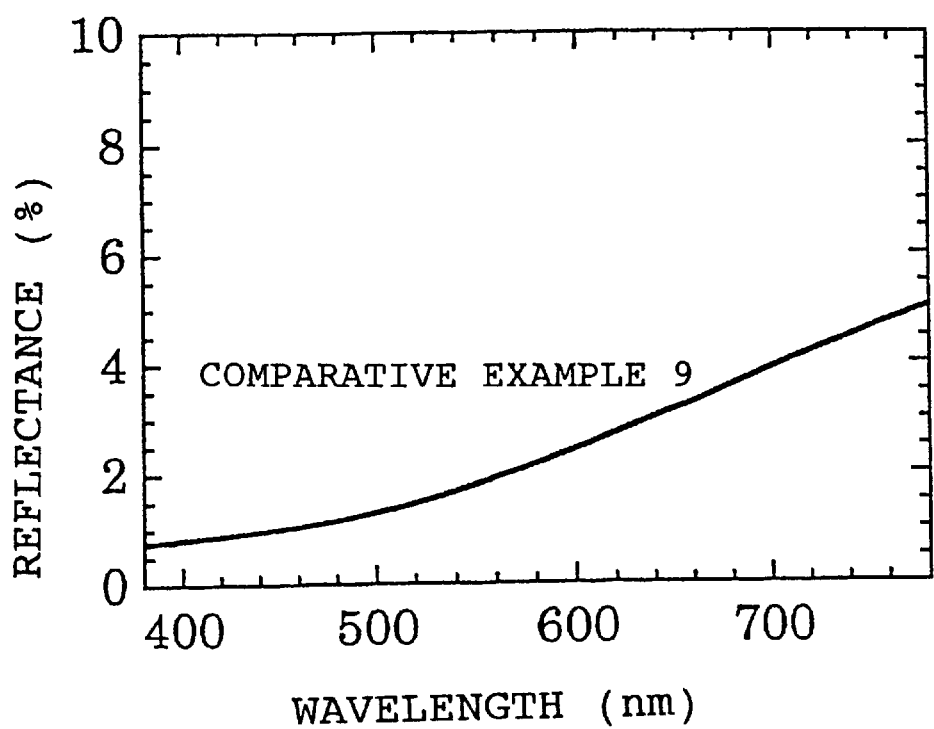
FIG. 28 is a graph showing the reflection profile of the low-transmission transparent layered structure of Comparative Example 9.
Figure 29:
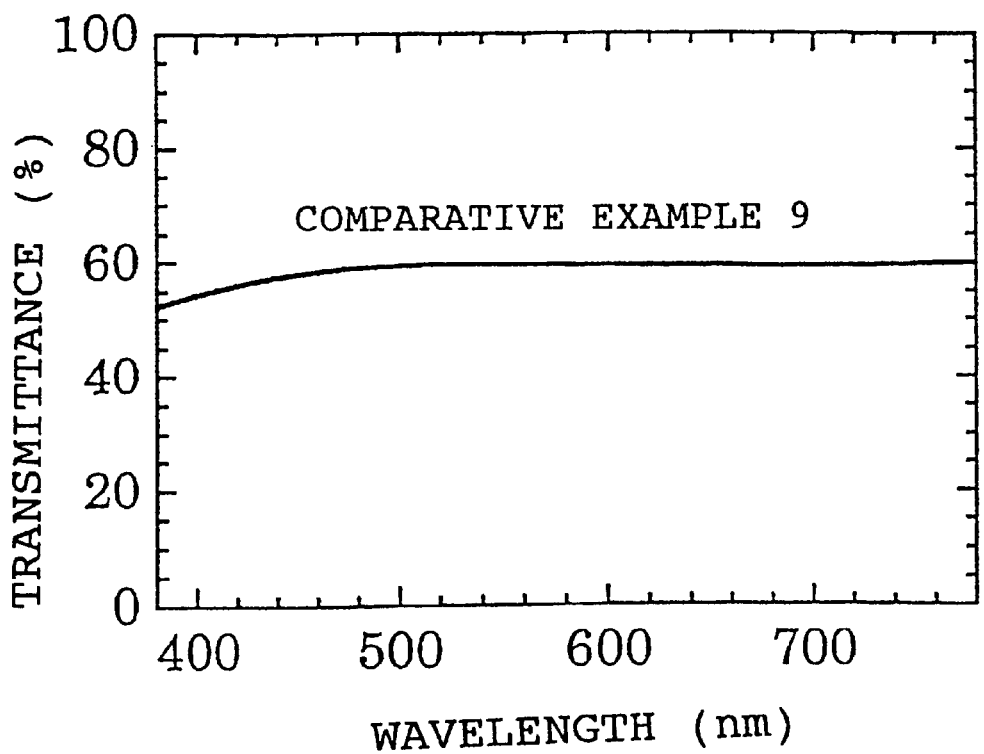
FIG. 29 is a graph showing the transmission profile of the low-transmission transparent layered structure of Comparative Example 9.

Also, the film characteristics of the single layer film formed on the glass substrate are shown in Table 5 below. Also, the reflection profile of the low-transmission transparent layered structure of Comparative Example 9 is shown in FIG. 28 and the transmission profile thereof is shown in FIG. 29.

TABLE 5

| | Kind of fine particles | Carbon/titanium compound (*5) | Transmittance of visible light (%) | Standard deviation of transmittance (*6) | Haze value (%) | Bottom reflectance/bottom wavelength (nm) | Surface resistance (Ω/Square) |
|---|---|---|---|---|---|---|---|
| E7 | Carbon + titanium oxynitride | 100/188 | 60.1 | 1.91 | 3.0 | 0.58/595 | $3.7 \times 10^7$ |
| E8 | Carbon + titanium oxynitride | 100/563 | 62.8 | 1.67 | 2.6 | 1.09/585 | $1.5 \times 10^8$ |
| E9 | Carbon + titanium sub-oxide | 100/2250 | 59.2 | 2.98 | 1.8 | 1.46/500 | $4.0 \times 10^8$ |
| E10 | Carbon + titanium oxynitride | 100/188 | 61.5 | 1.53 | 2.2 | 1.53/605 | $3.7 \times 10^7$ |
| CE6 | Carbon | — | 52.4 | 9.30 | 0.5 | 0.34/630 | $1.0 \times 10^5$ |
| CE7 | Titanium oxynitride | — | 62.8 | 3.48 | 3.3 | 1.31/570 | $1.7 \times 10^8$ |
| CE8 | Carbon + titanium oxynitride | 100/63 | 56.3 | 5.76 | 1.0 | 0.06/595 | $6.7 \times 10^8$ |
| CE9 | Carbon + titanium oxynitride | 100/188 | 58.8 | 1.72 | 4.1 | — | — |

E: Example,
CE: Comparative Example
(*5): Weight part of carbon/weight part of black titanium compound.
(*6): Standard deviation (%) to the transmittance (%) of the double layer film only or the single layer film only without containing the transparent substrate in each wavelength every 5 nm in a visible light region (380 to 780 nm).

Each of the low-transmission transparent layered structures obtained in Examples 7 to 10 was immersed in an aqueous solution of 10% sodium chloride, an aqueous solution of 50% acetic acid, and an aqueous solution of 5% ammonia for 24 hours, and the transmittance and the appearance of the each low-transmission transparent layer formed on the transparent substrate (glass substrate) were investigated but the changes were not observed in each case.

The film strength of each of the low-transmission transparent layered structures obtained in Examples 7 to 10 and Comparative Example 9 was evaluated by a pencil hardness test (load 1 kg) and the results are shown in Table 6 below.

TABLE 6

| | Pencil Hardness |
|---|---|
| Example 7 | 7 H |
| Example 8 | 7 H |
| Example 9 | 7 H |

TABLE 6-continued

| | Pencil Hardness |
|---|---|
| Example 10 | 7 H |
| Comparative Example 9 | <H |

EXAMPLE 11

After mixing 20.0 g of the ATO fine particles having a mean particle size of 10 nm (SN-100P, trade name, manufactured by ISHIHARA SANGYO KAISHA, LTD.) with 1.1 g of a dispersing agent and 78.9 g of EA, the mixture was dispersed with zirconia beads in a paint shaker to obtain a dispersion (liquid G) of the ATO fine particles having a dispersed particle size of 45 nm.

By adding 0.4 g of the liquid A in Example 1, 4.8 g of the liquid B in Example 1, EA, and IPA to 1.68 g of the liquid G, a low-transmission transparent layer forming coating liquid containing the composite oxide fine particles of iron, manganese, and copper, the ATO fine particles, and the inorganic binder (Fe—Mn—Cu—O: 0.80%, ATO: 3.36%, $SiO_2$: 4.80%, water: 7.3%, EA: 72.1%, and IPA: 11.6%) was prepared.

Then, by following the same procedure as Example 1 using the low-transmission transparent layer forming coating liquid obtained, a glass substrate having formed thereon a low-transmission transparent layer, that is, the low-transmission transparent layered structure of Example 11 was obtained.

Also, the film characteristics of the low-transmission transparent layer formed on the glass substrate are shown in Table 7 below.

EXAMPLE 12

By adding PGM and DM to the mixture of 0.43 g of the liquid G in Example 11 and 0.4 g of the liquid A in Example 1, a low-transmission transparent layer forming coating liquid containing the composite oxide fine particles of iron, manganese, and copper and the ATO fine particles (Fe—Mn—Cu—O: 0.8%, ATO: 0.86%, water: 2.5%. EA: 3.4%, PGM: 87.4%, and DAA: 5.0%) was prepared.

Then, by following the same procedure as Example 4 using the low-transmission transparent layer forming coating liquid containing the composite oxide fine particles of iron, manganese, and copper and the ATO fine particles, a glass substrate having formed thereon a double layer film constituted of the low-transmission transparent layer containing the composite oxide fine particles of iron, manganese, and copper and the ATO fine particles and a transparent coat layer composed of a silicate film made of silicon oxide as the main constituent, that is, the low-transmission transparent layered structure of Example 12 was obtained.

Also, the film characteristics of the double layer film formed on the glass substrate are shown in Table 7 below.

EXAMPLE 13

By following the same procedure as Example 12 except that using 0.6 g of the liquid G in Example 12 and 0.25 g of the liquid A in Example 1, a low-transmission transparent layer forming coating liquid containing the composite oxide fine particles of iron, manganese, and copper and the ATO fine particles (Fe—Mn—Cu—O: 0.5%, ATO: 1.2%, water: 1.5%, EA: 4.7%, PGM: 87.1%, and DAA: 5.0%) was prepared, a glass substrate having formed thereon a double layer film constituted of the low-transmission transparent layer containing the composite oxide fine particles of iron, manganese, and copper and the ATO fine particles and a transparent coat layer composed of a silicate film made of silicon oxide as the main constituent, that is, a low-transmission transparent layered structure of Example 13 was obtained.

The film characteristics of the double layer film formed on the glass substrate are shown in Table 7 below.

EXAMPLE 14

After mixing 20.0 g of ITO fine particles having a mean particle size of 30 nm (SUFP-HX, trade name, manufactured by SUMITOMO METAL MINING CO., LTD.) with 1.5 g of a dispersing agent and 78.5 g of EA, the mixture was dispersed with zirconium beads in a paint shaker, a dispersion (liquid H) of the ITO fine particles having a dispersed particle size of 105 nm was obtained.

Then, by following the same procedure as Example 12 expect that by adding PGM and DAA to a mixture of 0.4 g of the liquid H described above, 0.3 g of the liquid D in Example 7, 0.16 g of the liquid E in Example 7, and 0.46 g of the liquid B in Example 1, a low-transmission transparent layer forming coating liquid for forming a low-transmission transparent layer containing the carbon fine particles, the black titanium oxynitride fine particles, the ITO fine particles, and the silica sol (carbon: 0.16%, black titanium oxynitride: 0.30%, ITO: 0.8%, $SiO_2$: 0.46%, water: 2.90%, EA.: 6.4%, IPA: 1.4%, PGM: 82.5%, and DAA: 5.0%) was prepared, a glass substrate having formed thereon a double layer film constituted of the low-transmission transparent layer containing the carbon fine particles, the black titanium oxynitride fine particles, and the ITO fine particles and a transparent coat layer composed of a silicate film made of silicon oxide as the main constituent, that is, the low-transmission transparent layered structure of Example 14 was obtained.

Also, the film characteristics of the double layer film formed on the glass substrate are shown in Table 7 below.

TABLE 7

| | Kind of fine particles | B.P. fine particles/ E.C.O. fine particles (*7) | Transmittance of visible light (%) | Standard deviation of transmittance (*8) | Haze value (%) | Bottom reflectance/ bottom wavelength (nm) | Surface resistance (Ω/square) |
|---|---|---|---|---|---|---|---|
| E11 | Fe—Mn—Cu—O + ATO | 100/420 | 55.0 | 3.82 | 1.0 | — | $8.4 \times 10^9$ |
| E12 | Fe—Mn—Cu—O + ATO | 100/108 | 62.9 | 3.49 | 0.5 | 0.66/560 | $9.0 \times 10^9$ |
| E13 | Fe—Mn—Cu—O + ATO | 100/240 | 77.7 | 2.72 | 0.3 | 0.35/595 | $2.3 \times 10^8$ |

TABLE 7-continued

| | Kind of fine particles | B.P. fine particles/ E.C.O. fine particles (*7) | Transmittance of visible light (%) | Standard deviation of transmittance (*8) | Haze value (%) | Bottom reflectance/ bottom wavelength (nm) | Surface resistance (Ω/square) |
|---|---|---|---|---|---|---|---|
| E14 | Carbon + titanium oxynitride + ITO | 100/174 | 65.3 | 1.63 | 1.9 | 0.84/585 | $2.7 \times 10^5$ |

E: Example,
B.P.: Black pigment
E.C.O.: Electrically conductive oxide
(*7): Weight parts of black pigment fine particles/weight parts of electrically conductive oxide fine particles.
(*8): Standard deviation (%) of the transmittance (%) of the low-transmission transparent layer only or the double layer film only without containing the transparent substrate in each wavelength every 5 nm of a visible light wavelength region (380 to 780 nm).

Each of the low-transmission transparent substrates obtained in Examples 11 to 14 was immersed in an aqueous solution of 10% sodium chloride and an aqueous solution of 5% ammonia for 24 hours and the transmittance and the appearance of each low-transmission transparent layer formed on the transparent substrate (glass substrate) were investigated but the changes were not observed in each case. Then, the similar test was carried out using an aqueous solution of 50% acetic acid and the results are shown in Table 8 below.

TABLE 8

| | Transitance (%) | | |
|---|---|---|---|
| | Inital value | Value after immersing in aqueous 50% acetic acid solution | Appearance of double layer film |
| Example 11 | 55.0 | 58.4 | No change |
| Example 12 | 62.9 | 63.9 | No change |
| Example 13 | 77.7 | 78.2 | No change |
| Example 14 | 65.3 | 65.4 | No change |

As described above, according to the present invention, a low-transmission transparent layered structure, , which has a flat transmission profile, can provide a low reflectance and antistatic and electric field shielding functions, and further can reduce the production cost, and the production method of the low-transmission transparent layered structure are provided and also a display device to which the low-transmission transparent layered. structure is applied can be provided.

What is claimed is:

1. A low-transmission transparent layered structure comprising a transparent substrate and a low-transmission transparent layer formed on the transparent substrate, wherein the low-transmission transparent layer is constituted of black pigment fine particles having a mean particle size from 10 to 15 nm and a binder matrix as the main constituents, the black pigment fine particles being composite oxide fine particles of iron, manganese, and copper, or are carbon fine particles and black titanium compound fine particles, the visible light transmittance of the low-transmission transparent layer is from 40 to 90%, and the standard deviation of the transmittance of the low-transmission transparent layer in each wavelength every 5 nm of a visible light wavelength region (380 to 780 nm) is 5% or lower.

2. The low-transmission transparent layered structure according to claim 1 wherein the black titanium compound is black titanium oxide or black titanium oxynitride.

3. The low-transmission transparent layered structure according to claim 1 or 2 wherein the mixing ratio of the black titanium compound fine particles to the carbon fine particles is from 80 to 2500 parts by weight of the black titanium compound fine particles to 100 parts by weight of the carbon fine particles.

4. The low-transmission transparent layered structure according to claim 1 or 2 wherein the constituting ratio of the binder matrix to the black pigment fine particles in the low-transmission transparent layer is from 150 to 650 parts by weight of the binder matrix to 100 parts by weight of the black pigment fine particles.

5. The low-transmission transparent layered structure according to claim 1 or 2 wherein the low-transmission transparent layer contains electrically conductive oxide fine particles having a mean particle size of from 10 to 150 nm, the compounding amount of the electrically conductive oxide fine particles is from 50 to 1000 parts by weight to 100 parts by weight of the black pigment fine particles, and the surface resistance of the low-transmission transparent layer is from $10^4$ to $10^{10}$ Ω/square.

6. The low-transmission transparent layered structure according to claim 5 wherein the electrically conductive oxide fine particles are at least one kind of fine particles selected from indium tin oxide fine particles and tin antimony oxide fine particles.

7. The low-transmission transparent layered structure according to claim 5 wherein the low-transmission transparent layered structure is a low-transmission transparent layered structure having a double layer film formed by forming on the transparent substrate the low-transmission transparent layer containing the electrically conductive fine particles and further a transparent coat layer, the reflectance of the low-transmission transparent layered structure, which becomes the minimum in the reflection profile of a visible light region, is 3% or lower, the surface resistance and the visible light transmittance of the double layer film are $10^4$ to $10^{10}$ Ω/square and from 40 to 90%, respectively, and further, the reflectance of the low-transmission transparent layered structure, which becomes the minimum in the reflection profile of a visible light region, is 3% or lower, the visible light transmittance of the double layer film if from 40 to 90%, and further the standard deviation of the transmittance of the double layer film in each wavelength every 5 nm of a visible light wavelength region (380 to 780 nm) is 5% or lower.

8. The low-transmission transparent layered structure according to claim 7, wherein the binder matrix in the transparent coat layer is mode of silicon oxide as the main constituent.

9. A display device comprising a main body and a front face plate disposed at a front face side of the main body, wherein the low-transmission transparent layered structure described in claim 7 is incorporated therein by disposing with the low-transmission transparent layer side thereof outside as the front face plate.

10. A display device comprising a main body and a front face plate disposed at a front face side of the main body, wherein the low-transmission transparent layered structure defined in claim 5 is incorporated therein by disposing with the low-transmission transparent layer side thereof outside as the front face plate.

11. The low-transmission transparent layered structure according to claim 1 or 2 wherein the low-transmission transparent layered structure is a low-transmission transparent layered structure having a double layer film formed by forming on the transparent substrate the low-transmission transparent layer and further a transparent coat layer, the reflectance of the low-transmission transparent layered structure, which becomes minimum in the reflection profile of a visible light region, is 3% or lower, the visible light transmittance of the double layer film is from 40 to 90%, and further the standard deviation of the transmittance of the double layer film in each wavelength every 5 nm of a visible light wavelength region (380 to 780 nm) is 5% or lower.

12. The low-transmission transparent layered structure according to claim 11, wherein the binder matrix in the transparent coat layer is made of silicon oxide as the main constituent.

13. A display device comprising a main body and a front face plate disposed at a front face side of the main body, wherein the low-transmission transparent layered structure described in claim 11 is incorporated therein by disposing with the low-transmission transparent layer side thereof outside as the front face plate.

14. The low-transmission transparent layered structure according to claim 1 or 2 wherein the binder matrix in the low-transmission transparent layer is made of silicon oxide as the main constituent.

15. A display device comprising a main body and a front face plate disposed at a front face side of the main body, wherein the low-transmission transparent layered structure described in claim 1 or 2 is incorporated therein by disposing with the low-transmission transparent layer side thereof outside as the front face plate.

16. A method of producing a low-transmission transparent layered structure, which comprises preparing a low-transmission transparent layer forming coating liquid by dispersing black pigment fine particles having a mean particle size of from 10 to 150 nm made of composite oxide fine particles of iron, manganese, and copper, or made of carbon fine particles and black titanium compound fine particles, and an inorganic binder constituting a binder matrix in a solvent as the main constituents, and, after coating the low-transmission transparent layer forming coating liquid on a transparent substrate, heat-treating the coated layer, wherein the constituting ratio of the inorganic binder to the black pigment fine particles in the low-transmission transparent layer forming coating liquid is from 150 to 650 parts by weight of the inorganic binder to 100 parts by weight of the black pigment fine particles.

17. The method of producing a low-transmission transparent layered structure according to claim 16 wherein the low-transmission transparent layer forming coating liquid contains electrically conductive oxide fine particles having a mean particle size of from 10 to 150 nm and the compounding amount of the electrically conductive fine particles is from 50 to 1000 parts by weight to 100 parts by weight of the black pigment fine particles.

18. A method of producing a low-transmission transparent layered structure, which comprises preparing a low-transmission transparent layer forming coating liquid by dispersing black pigment fine particles having a mean particle size of from 10 to 150 nm made of composite oxide fine particles of iron, manganese, and copper, or made of carbon fine particles and black titanium compound fine particles in a solvent as the main constituent, coating the low-transmission transparent layer forming coating liquid on a transparent substrate, and then, after further coating thereon a transparent coat layer forming coating liquid, heat-treating the coated layers.

19. The method of producing a low-transmission transparent layered structure according to claim 18 wherein the low-transmission transparent layer forming coating liquid further contains electric conductive oxide fine particles having a mean particle size of from 10 to 150 nm, and the compounding amount of the electrically conductive fine particles is from 50 to 1000 parts by weight to 100 parts by weight of the black pigment fine particles.

20. The method of producing a low-transmission transparent layered structure according to claim 18 or 19 wherein the low-transmission transparent layer forming coating liquid further contains an inorganic binder constituting a binder matrix.

21. The method of producing a low-transmission transparent layered structure according to claim 17 or 19 wherein the electrically conductive oxide fine particles are at least one kind of fine particles selected from indium tin oxide fine particles and tin antimony oxide fine particles.

22. The method of producing a low-transmission transparent layered structure according to claim 16, 17, 18 or 19 wherein the black titanium compound is black titanium oxide or black titanium oxynitride.

23. The method of producing a low-transmission transparent layered structure according to claim 16, 17, 18 or 19 wherein the mixing ratio of the black titanium compound fine particles to the carbon fine particles is from 80 to 2500 parts by weight of the black titanium compound fine particles to 100 parts by weight of the carbon fine particles.

24. The method of producing a low-transmission transparent layered structure according to claim 16, 17, 18 or 19 wherein the inorganic binder of the low-transmission transparent layer forming coating liquid and the transparent coat layer forming coating liquid is made of a silica sol as the main constituent.

\* \* \* \* \*

UNITED STATES PATENT AND TRADEMARK OFFICE
CERTIFICATE OF CORRECTION

PATENT NO.    : 6,423,404 B1
DATED         : July 23, 2002
INVENTOR(S)   : Yoshihiro Ohtsuka and Masaya Yukinobu It is certified that error appears in the above-identified patent and that said Letters Patent is hereby corrected as shown below:

<u>Title page,</u>
Item [30], insert:
-- [30]   Foreign Application Priority Data
      Jan. 18, 1999  [JP] Japan ................... 11-8718
      Jan. 18, 1999  [JP] Japan ................... 11-8790
      Jan. 18, 1999  [JP] Japan ................... 11-8851
      Dec. 14, 1999 [JP] Japan ................... 11-354757 --

Signed and Sealed this

Seventh Day of January, 2003

JAMES E. ROGAN
*Director of the United States Patent and Trademark Office*